United States Patent
Wamsley et al.

(10) Patent No.: US 12,281,221 B2
(45) Date of Patent: Apr. 22, 2025

(54) TIRES COMPRISING RUBBER COMPOUNDS THAT COMPRISE PROPYLENE-α-OLEFIN-DIENE POLYMERS

(71) Applicant: ExxonMobil Chemical Patents Inc., Baytown, TX (US)

(72) Inventors: Eric J. Wamsley, Baytown, TX (US); Babu Shanmugasundaram, Chennai (IN); Zhifeng Bai, Houston, TX (US); Sushil K. Mandot, Houston, TX (US); Sunny Jacob, Seabrook, TX (US); Milind B. Joshi, Bengaluru (IN)

(73) Assignee: ExxonMobil Engineering & Technology Company, Baytown, TX (US)

( * ) Notice: Subject to any disclaimer, the term of this patent is extended or adjusted under 35 U.S.C. 154(b) by 665 days.

(21) Appl. No.: 17/624,885

(22) PCT Filed: Jul. 17, 2020

(86) PCT No.: PCT/US2020/042633
§ 371 (c)(1),
(2) Date: Jan. 5, 2022

(87) PCT Pub. No.: WO2021/011906
PCT Pub. Date: Jan. 21, 2021

(65) Prior Publication Data
US 2022/0288971 A1    Sep. 15, 2022

Related U.S. Application Data

(60) Provisional application No. 62/875,196, filed on Jul. 17, 2019.

(51) Int. Cl.

| | |
|---|---|
| C08J 3/22 | (2006.01) |
| B60C 1/00 | (2006.01) |
| C08F 4/602 | (2006.01) |
| C08F 4/6592 | (2006.01) |
| C08F 210/02 | (2006.01) |
| C08F 210/06 | (2006.01) |
| C08J 3/24 | (2006.01) |
| C08K 5/01 | (2006.01) |
| C08L 7/00 | (2006.01) |
| C08L 9/00 | (2006.01) |
| C08L 23/16 | (2006.01) |
| C08L 23/22 | (2006.01) |

(Continued)

(52) U.S. Cl.
CPC ............ *C08L 23/16* (2013.01); *B60C 1/0008* (2013.01); *B60C 1/0025* (2013.01); *C08F 4/6028* (2013.01); *C08F 4/6592* (2013.01); *C08F 210/02* (2013.01); *C08F 210/06* (2013.01); *C08J 3/22* (2013.01); *C08J 3/24* (2013.01); *C08K 5/01* (2013.01); *C08L 7/00* (2013.01); *C08L 9/00* (2013.01); *C08L 23/22* (2013.01); *C08L 23/283* (2013.01); *C09J 123/16* (2013.01); *C08L 2205/02* (2013.01); *C08L 2205/025* (2013.01); *C08L 2205/03* (2013.01); *C08L 2312/00* (2013.01); *C08L 2314/06* (2013.01); *C09J 2423/16* (2013.01); *C09J 2467/006* (2013.01)

(58) Field of Classification Search
CPC .......... C08L 23/16; C08L 23/22; C08L 23/28; C08L 7/00; C08L 9/00; C08J 3/22
USPC ....................................................... 523/156
See application file for complete search history.

(56) References Cited

U.S. PATENT DOCUMENTS

| | | |
|---|---|---|
| 5,571,868 A | 11/1996 | Datta et al. |
| 5,654,370 A | 8/1997 | Datta et al. |

(Continued)

FOREIGN PATENT DOCUMENTS

| | | |
|---|---|---|
| EP | 1062105 | 12/2000 |
| JP | 2017-075236 | 4/2017 |

(Continued)

OTHER PUBLICATIONS

J.R. Beatty, "Tel-Tak: A Mechanical Method for Estimating Both Tackiness and Stickiness of Rubber Compounds", Rubber Chemistry and Technology, vol. 42, pp. 1040-1053 (1969).

(Continued)

*Primary Examiner* — Deve V Hall

(57) ABSTRACT

Rubber compounds that comprise rubber and propylene-a-olefin-diene (PE(D)M) polymers may be useful in tire-related articles (e.g., tire sidewalls, inner tubes, and inner-liners). Such a rubber compound may comprise: about 5 phr to about 50 phr of the PE(D)M polymer that comprises about 65 wt % to about 99.5 wt % propylene, about 0.5 wt % to about 35 wt % a-olefin that is not propylene, and 0 wt % to about 20 wt % diene, said wt % based on the weight of the PE(D)M polymer, and about 50 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof.

25 Claims, 1 Drawing Sheet

(51) Int. Cl.
*C08L 23/28* (2006.01)
*C08L 23/283* (2025.01)
*C09J 123/16* (2006.01)

(56) References Cited

U.S. PATENT DOCUMENTS

| | | |
|---|---|---|
| 6,235,394 B1 | 5/2001 | Shimazawa et al. |
| 6,235,800 B1 | 5/2001 | Kyuno et al. |
| 6,274,676 B1 | 8/2001 | Lin et al. |
| 7,199,189 B2 | 4/2007 | Ravishankar et al. |
| 7,390,866 B2 | 6/2008 | Datta et al. |
| 7,605,217 B2 | 10/2009 | Datta et al. |
| 7,867,433 B2 | 1/2011 | Jacob et al. |
| 7,928,165 B2 | 4/2011 | Datta et al. |
| 8,013,093 B2 | 9/2011 | Datta et al. |
| 8,765,832 B2 | 7/2014 | Jacob |
| 8,841,383 B2 | 9/2014 | Rodgers et al. |
| 9,469,753 B2* | 10/2016 | D'Cruz ............... C08L 23/142 |
| 10,899,853 B2 | 1/2021 | Canich et al. |
| 11,053,381 B2 | 7/2021 | Dharmarajan et al. |
| 2006/0167184 A1* | 7/2006 | Waddell ............... C08K 5/01 |
| | | 525/196 |
| 2011/0118404 A1 | 5/2011 | Jung et al. |
| 2013/0050488 A1 | 2/2013 | Brouard et al. |
| 2015/0021816 A1* | 1/2015 | D'Cruz ............... C08L 57/02 |
| | | 264/236 |
| 2021/0047505 A1 | 2/2021 | Loyd et al. |
| 2021/0371634 A1 | 12/2021 | Dharmarajan et al. |

FOREIGN PATENT DOCUMENTS

| | | |
|---|---|---|
| WO | 2016/053541 | 4/2016 |
| WO | 2016/053542 | 4/2016 |
| WO | 2016/114914 | 7/2016 |
| WO | 2020/150090 | 7/2020 |

OTHER PUBLICATIONS

G.R. Hamid, "Tack and Green Strength of Elastomeric Materials", Rubber Chemistry and Technology, vol. 54, pp. 576-595 (1981).

* cited by examiner

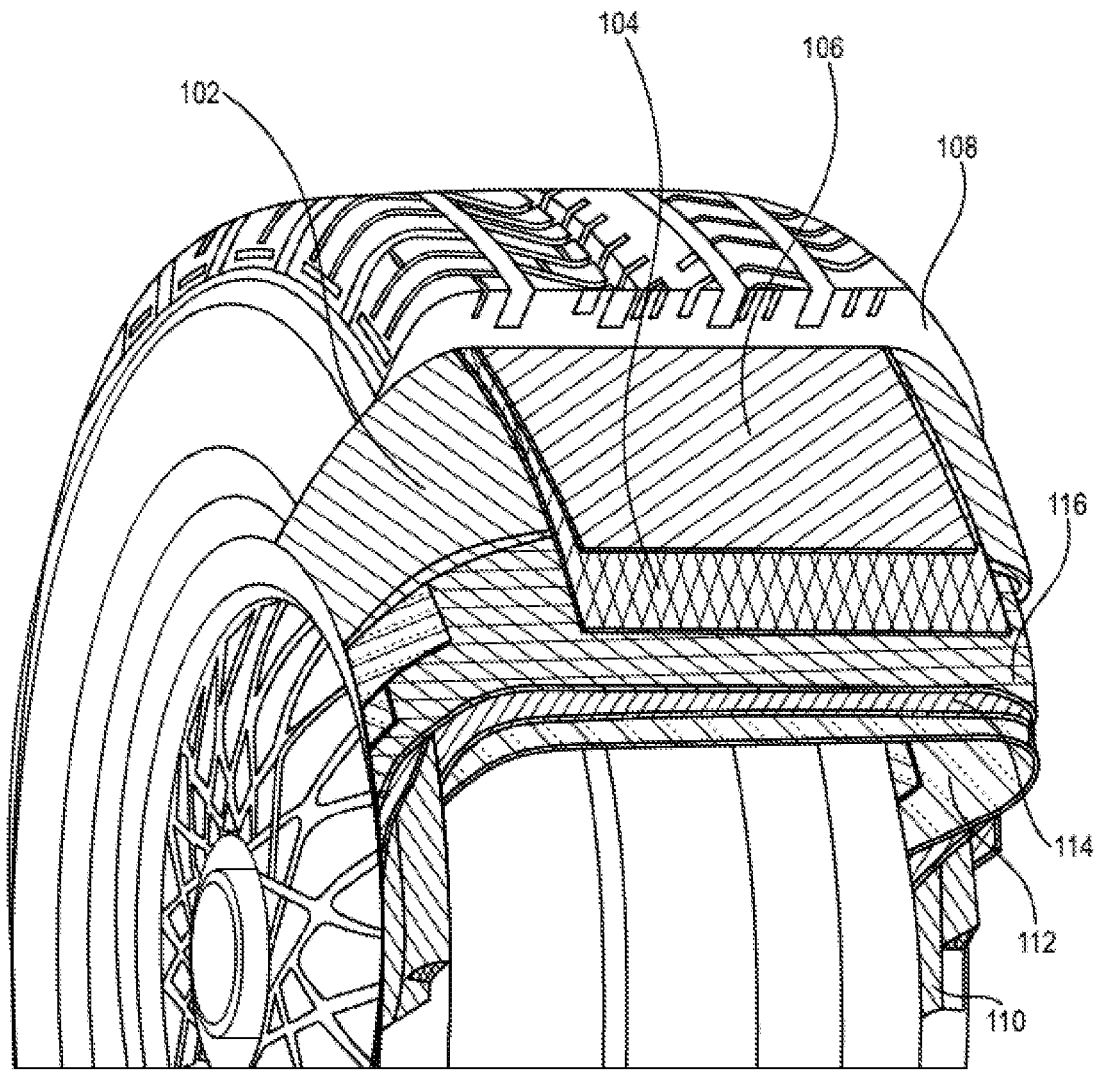

TIRES COMPRISING RUBBER COMPOUNDS THAT COMPRISE PROPYLENE-α-OLEFIN-DIENE POLYMERS

CROSS REFERENCE TO RELATED APPLICATIONS

This application is a U.S. national phase application of PCT Application No. PCT/US2020/042633 having a filing date of Jul. 17, 2020, which claims priority to and the benefit of U.S. Provisional Application Ser. No. 62/875,196 having a filing date of Jul. 17, 2019, the contents of both of which are incorporated by reference in their entirety.

BACKGROUND

The present disclosure relates to rubber compounds and tire-related articles.

The term "tire" as used herein refers to a strong, flexible rubber casing that is capable of being attached to the rim of a wheel on a vehicle (e.g., car, bike, truck, bus, passenger car, plane, and the like). Modern tire technology blends a unique mix of chemistry, physics, and engineering to give consumers a high degree of comfort, performance, efficiency, reliability and safety. Many tires are custom-designed to meet the stresses and performance needs specified by the maker of a particular model vehicle.

Tires contain many rubber compounds and other materials required to safely perform in the face of a wide range of demanding conditions. Tires are expected to perform for thousands of miles while retaining their essential performance and safety properties. The FIGURE illustrates certain components of a generic tire, which include a tire sidewall 102, a first belt 104, a second belt 106, a tread 108, a bead 110, an innerliner 112, a first body ply 114, and a second body ply 116. A tire innertube (not illustrated) is an inflatable tube containing air that is placed in between a metal rim and innerliner 112 for tube-type tires.

The plies 114 and 116 function as the structure of the tire and provide the strength to contain its inflation pressure in the tire inner tube. The plies 114 and 116 also give the tire strength and flexibility. While the plies 114 and 116 serve as the primary reinforcing material in the tire casing, the plies 114 and 116 also help the tire keep its shape in different road conditions, which provide added endurance and performance characteristics to the tire. The bead 110 assures an air-tight fit to the wheel. The first and second belts 104 and 106 provide stability and strength to the tread area of the tire. The innerliner 112 usually contains a rubber compound and is used to retain the inflation pressure inside the tire. The sidewall 102 usually includes a rubber compound and is used to cover the plies 114 and 116 on the sides of the tires, which provides protection from road and curb damage. The tread 108 usually contains a rubber compound and tread pattern to provide grip and traction.

Passenger and light truck tires usually include a mixture of various components. Generally, a tire is about 19% natural rubber; this natural rubber provides specific performance characteristics to tires, including tear and fatigue crack resistance. Another component is synthetic polymers, which may comprise about 24% of a tire's composition. The two most often used synthetic polymer in passenger and light truck tires include butadiene rubber and styrene butadiene rubber. The physical and chemical properties of these synthetic polymers help determine the performance of the tire (e.g., rolling resistance, wear, and traction). Another synthetic rubber that may be used is halogenated poly-isobutylene rubber, commonly known as halobutyl rubber. This material is thought to make the innerliner relatively impermeable, which helps to keep the tire inflated. Another synthetic polymer that can be included in a tire composition are ethylene-propylene-diene polymers, known as EP(D)M polymers or EP(D)M rubbers where the inclusion of diene is optional.

Another component of a passenger and light truck tire is steel wire (representing approximately 12% of a tire's composition), which is used in the tire belts and beads. The belts serve to stiffen the tire casing and improve wear performance and tire handling. The bead wire anchors the tire and locks it onto the wheel. Another component of passenger and light truck tires includes textile fabric cords that reinforce the tire; approximately 4% of a tire's composition. These textile fabric cords are usually made from polyester cord fabrics, rayon cord fabrics, nylon cord fabrics, and aramid cord fabrics. These fabric cords are used to make the plies (e.g., plies 114 and 116 in the FIGURE). Fillers such as carbon black and silica are used to reinforce the rubber to improve properties such as tear, tensile strength, and abrasion resistance for improved wear performance, traction, and rolling resistance. Fillers usually comprise about 26% of the composition of a passenger and light truck tire. Antioxidants, antiozonants, and curing agents comprise the remaining 14%. Antioxidants help to keep the rubber from breaking down due to the effects of temperature and oxygen exposure. Antiozonants may be used to impede the effects of exposure to ozone on the surface of the tire. Curing agents such as sulfur and zinc oxide transform rubber into a solid article during vulcanization or tire curing. Curing agents shorten the vulcanization time and impact the length and number of crosslinks in the rubber matrix that form during tire curing or vulcanization.

Large truck tires contain the same elements as do passenger and light truck tires, except for the textile component. Additionally, the percent of natural rubber is usually closer to 34% and the percent of synthetic polymers is usually closer to 11% in most large truck tire compositions. Truck tires also often contain a higher percentage of steel (e.g., about 21%). Fillers usually comprise about 24% of the large truck tire composition and antioxidants, antiozonants, and curing agents comprise the remaining 10%.

The tire production process begins with the selection of several types of rubber along with special oils, carbon black, pigments, antioxidants, silica, and other additives that will combine to provide the exact characteristics wanted. A machine called a BANBURY™ mixer combines the various raw materials for each compound into a homogenized batch of black material with the consistency of gum. The mixing process is computer-controlled to assure uniformity. The compounded materials are then sent to machines for further processing into the sidewalls, treads or other parts of the tire. Then, the task of assembling the tire begins.

Tire assembly occurs in layers that generally start from the inside out. Tack between the layers is important to mitigate the formation of bubbles and other defects that can be problematic in the final tire product. The tack between layers before curing is referred to as green tack.

Green tack is an important consideration to ensure strong and consistent splice properties to avoid any failure or opening at splice area during storage of product or in actual use. When a rubber composition does not have sufficient green tack, hydrocarbon or phenolic tackifying resins may be added to the inner tube composition. Additionally, the industry has been searching for rubber compositions with improved tack for each of the various components or layers of the tire that also maintain, or preferably improve, the physical properties and traction of the final tire.

Some potentially relevant background references include: WIPO Publication Nos. WO 2016/053541, WO 2016/053542, WO 2016/114914; U.S. Pat. Nos. 5,654,370; 5,571,868; 7,199,189; 7,390,866; 7,605,217; 7,867,433; 7,928,165; 8,013,093; 8,765,832; and 8,841,383; U.S. Patent Publication No. 2013/050488; as well as J. R. Beatty, *Rubber Chem. & Tech.*, 42, 1041 (1969), and G. R. Hamed, *Rubber Chem. & Tech.*, 54, 578 (1981).

SUMMARY

The present disclosure relates to rubber compounds that comprise rubber and propylene-α-olefin-diene (PE(D)M) polymers and tire-related articles comprising such rubber compounds.

Described herein are tires that comprise: a rubber compound that comprises: about 5 phr to about 50 phr of a propylene-α-olefin-(optional diene) PE(D)M polymer that comprises about 65 wt % to about 99.5 wt % propylene, about 0.5 wt % to about 35 wt % α-olefin that is not propylene, and 0 wt % to about 20 wt % diene, said wt % based on the weight of the PE(D)M polymer, and about 50 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof; and wherein the rubber and the PE(D)M polymer cumulatively are 100 phr.

Also described herein are methods that comprise: producing a master batch at a first temperature, the master batch comprising: about 5 phr to about 50 phr of a propylene-α-olefin-(optional diene) PE(D)M polymer that comprises about 65 wt % to about 99.5 wt % propylene, about 0.5 wt % to about 35 wt % α-olefin that is not propylene, and 0 wt % to about 20 wt % diene, said wt % based on the weight of the PE(D)M polymer, and about 50 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof; wherein the rubber and the PE(D)M polymer cumulatively are 100 phr; and mixing a curative and/or a crosslinking agent into the master batch at a second temperature that is lower than the first temperature.

Also described herein are tires that comprise: a sidewall that comprises a rubber compound that comprises: about 5 phr to about 50 phr of a propylene-α-olefin-(optional diene) PE(D)M polymer that comprises about 65 wt % to about 99.5 wt % propylene, about 0.5 wt % to about 35 wt % α-olefin that is not propylene, and 0 wt % to about 20 wt % diene, said wt % based on the weight of the PE(D)M polymer, and about 50 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof (preferably natural rubber, polybutadiene rubber, and any combination thereof); and wherein the rubber and the PE(D)M polymer cumulatively are 100 phr.

Also described herein are tires that comprise: an inner tube that comprises a rubber compound that comprises: about 5 phr to about 30 phr of a propylene-α-olefin-(optional diene) PE(D)M polymer that comprises about 65 wt % to about 99.5 wt % propylene, about 0.5 wt % to about 35 wt % α-olefin that is not propylene, and 0 wt % to about 20 wt % diene, said wt % based on the weight of the PE(D)M polymer, and about 70 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof (preferably IIR, BIIR, CIIR, and any combination thereof); and wherein the rubber and the PE(D)M polymer cumulatively are 100 phr.

Also described herein are tires that comprise: an innerliner that comprises a rubber compound that comprises: about 5 phr to about 20 phr of a propylene-α-olefin-(optional diene) PE(D)M polymer that comprises about 65 wt % to about 99.5 wt % propylene, about 0.5 wt % to about 35 wt % α-olefin that is not propylene, and 0 wt % to about 20 wt % diene, said wt % based on the weight of the PE(D)M polymer, and about 80 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof (preferably natural rubber, BIIR, CIIR, and any combination thereof); and wherein the rubber and the PE(D)M polymer cumulatively are 100 phr.

BRIEF DESCRIPTION OF THE FIGURES

The FIGURE illustrates the components of a nonlimiting example of a generic tire.

DETAILED DESCRIPTION

The present disclosure relates to rubber compounds and tire compositions that comprise rubber (e.g., natural rubber, polybutadiene rubber, bromobutyl rubber, chlorobutyl rubber, isoprene, EP(D)M rubber, and the like) and a PE(D)M polymer. Without being limited by theory, it is believed that the PE(D)M polymers described herein produce rubber compounds with improved green tack, tack aging, processing properties, crack initiation resistance, crack growth resistance, and ozone resistance. For example, processing properties are improved due to the reduced Mooney viscosities and higher Mooney Scorch safety. The improved green tackiness may improve the process of manufacturing a green tire. These improved properties provide tires having improved properties for better use and improved manufacturing. Because of these benefits, some additives such as oils, tackifiers (e.g., hydrocarbon/phenolic resin tackifiers such as EXCOREZ™ 1102, available from ExxonMobil, Inc.), and antidegradant chemicals (e.g., wax, 1,2-dihydro-2,2,4-trimethylquinoline (commercially available from Eastman Chemical as SANTOFLEX™ 6PPD), 2,2,4-trimethyl-1,2-dihydroquinoline polymer (TMQ), and the like) may be eliminated from the tire compositions as compared to traditional tire compositions.

The rubber compounds comprising PE(D)M polymers may be useful in various tire parts including, but not limited to, tire sidewalls, inner tubes, innerliners, and any combination thereof.

For example, inclusion of PE(D)M in the tire compositions of the present disclosure for use in tire sidewall applications can reduce the splice/joint opening in the tire sidewall due to improved tack provided by PE(D)M. Without being limited by theory, it is believed that inclusion of PE(D)M also improves the appearance of tire sidewalls by eliminating blooming of additive chemicals due to reduced dosages or elimination in formulations.

When used in an inner tube formulation, the tire compositions of the present disclosure, among other things, show higher green tack and PICMA tack values when compared to other formulations, which is advantageous to prevent rupture of the spliced joint.

Additionally, the tire compositions of the present disclosure with the inclusion of PE(D)M may be used to make thinner inner tubes, such as those used in bicycle tires and commercial heavy vehicles, which can reduce the overall weight of such tires.

Definitions and Test Methods

As used herein, the term "copolymer" is meant to include polymers having two or more monomers. The term "polymer" as used herein includes, but is not limited to, homopolymers, copolymers, terpolymers, etc., and alloys and blends thereof. The term "terpolymer" as used herein refers to a polymer synthesized from three different monomers. Terpolymers, in some embodiments, may be produced (1) by mixing all three monomers at the same time or (2) by sequential introduction of the different comonomers. The mixing of comonomers may be done in one, two, or possibly three different reactors in series and/or in parallel. The term "polymer" as used herein also includes impact, block, graft, random, gradient, and alternating copolymers. The term "polymer" shall further include all possible geometrical configurations unless otherwise specifically stated. Such configurations may include isotactic, syndiotactic and random (i.e., atactic) symmetries.

As used herein, the term "rubber" encompasses rubbers and elastomers.

The term "blend" in association with a polymer blend as used herein refers to a mixture of two or more polymers. Blends may be produced by, for example, solution blending, melt mixing, or compounding in a shear mixer. Solution blending is common for making adhesive formulations comprising baled butyl rubber, tackifier, and oil. Then, the solution blend is coated on a fabric substrate, and the solvent evaporated to leave the adhesive.

The term "monomer" or "comonomer," as used herein, can refer to the monomer used to form the polymer (i.e., the unreacted chemical compound in the form prior to polymerization) and can also refer to the monomer after it has been incorporated into the polymer, also referred to herein as a "[monomer]-derived unit." Different monomers are discussed herein, including propylene monomers, ethylene monomers, and diene monomers.

As used herein, an "ethylene-propylene-diene polymer" and an "EP(D)M polymer" refers to copolymers derived from ethylene, an α-olefin having 3 or more carbon atoms (e.g., 3-12 carbon atoms or 6-10 carbon atoms, preferably propylene), and optionally a diene. The EP(D)M polymer having an ethylene content (derived from ethylene monomers) and an α-olefin content (derived from α-olefin (preferably propylene) that is not ethylene), and optionally a diene content (derived from diene monomers, preferably non-conjugated diene monomers).

The terms "propylene-α-olefin-diene polymer" and "PE(D)M polymer" as used herein refers to a polymer derived from propylene, an α-olefin (e.g., $C_2$ or $C_4$ to $C_{16}$ α-olefin (preferably ethylene)) that is not propylene, and optionally diene monomers. The abbreviation "PEDM" refers to a polymer derived from propylene, an α-olefin (preferably ethylene) that is not propylene, and diene monomers. The term PE(D)M encompasses PEDM polymers.

As used herein, "phr" means "parts per hundred parts rubber," where the "rubber" is the total rubber content of the composition. Herein, the PE(D)M is considered to contribute to the total rubber content, such that in compositions where both are present, the "total rubber" is the combined weight of PE(D)M and other rubbers in the rubber compound. Thus, for example, a composition having 30 parts by weight of PE(D)M and 70 parts by weight of butyl rubber may be referred to as having 30 phr PE(D)M and 70 phr butyl rubber. Other components added to the composition are calculated on a phr basis. For example, addition of 50 phr of oil to a composition means that 50 g of oil are present in the composition for every 100 g of PE(D)M and butyl rubber combined. Unless specified otherwise, phr should be taken as phr on a weight basis.

"Mooney viscosity" as used herein is the Mooney viscosity of a polymer or mixture of polymers (e.g., a mixture of PE(D)M polymers and rubbers). The composition analyzed for determining Mooney viscosity should be substantially devoid of solvent. For instance, the sample may be placed on a boiling-water steam table in a hood to evaporate a large fraction of the solvent and unreacted monomers, and then dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes).

Unless otherwise indicated, Mooney viscosity is measured using a Mooney viscometer according to ASTM D1646-17, but with the following modifications/clarifications of that procedure. First, sample polymer is pressed between two hot plates of a compression press prior to testing. The plate temperature is 125° C.+/−10° C. instead of the 50+/−5° C. recommended in ASTM D1646-17, because 50° C. is unable to cause sufficient massing. Further, although ASTM D1646-17 allows for several options for die protection, should any two options provide conflicting results, PET 36 micron should be used as the die protection. Further, ASTM D1646-17 does not indicate a sample weight in Section 8; thus, to the extent results may vary based upon sample weight, Mooney viscosity is determined using a sample weight of 21.5+/−2.7 g in the D1646-17 Section 8 procedures will govern. Finally, the rest procedures before testing set forth in D1646-17 Section 8 are 23+/−3° C. for 30 min in air; Mooney values as reported herein were determined after resting at 24+/−3° C. for 30 min in air. Samples are placed on either side of a rotor according to the ASTM D1646-17 test method; torque required to turn the viscometer motor at 2 rpm is measured by a transducer for determining the Mooney viscosity. The results are reported as Mooney Units (ML, 1+4 @ 125° C.), where M is the Mooney viscosity number, L denotes large rotor (defined as ML in ASTM D1646-17), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 MU (ML, 1+4 @ 125° C.). Alternatively, the Mooney viscosity may be reported as 90 MU; in such instance, it should be assumed that the just-described method is used to determine such viscosity, unless otherwise noted. In some instances, a lower test temperature may be used (e.g., 100° C.), in which case Mooney is reported as Mooney Viscosity (ML, 1+4 @ 100° C.), or @ T° C. where T is the test temperature.

"Mooney scorch" as used herein refers to a test performed to determine the scorch time of rubber compounds. In the scorch test, viscosity decreases before increasing as vulcanization progresses. The test measures the time (scorch time) it takes for viscosity to increase from a minimum viscosity value (Vm) to a specified increased value (scorch point).

As used herein, "tensile strength" means the amount of stress applied to a sample to break the sample. It can be expressed in Pascals or pounds per square inch (psi). ASTM D412-16 can be used to determine tensile strength of a polymer.

Herein, the tack of a substance can be measured with two methods. The first method is PICMA tack where tack between two layers of uncured samples (the same samples) is measured using PICMA Tack Tester (e.g., Model P1 from M/s Toyo Seiki Seisaku-Sho, Ltd., Japan) under the following conditions: contact time of 30 seconds, rate of separation 25 mm/minute, applied contact load of 500 gram force, and specimen strips width of 10 mm. The PICMA Tack Tester has an upper measurement limit of 1.5 kgf. The second method is 90° peel separation tack (or rubber-to-rubber tack) with test specimen width of a half inch. The rubber-to-rubber tack/green tack testing was carried out based on Modified ASTM D3330/D330M-04(2010) Method B and F. This modified method employed elements of Method B and Method F within the parameters of the standard. Method B calls for application to material of interest not stainless steel. Method F calls for a 90° angle for thicker more rigid backings. In particular, the following modifications to the ASTM method were utilized: (1) instead of a 2 μm finish stainless steel substrate per the ASTM method, an uncured rubber sheeting test specimen (top-sample) and test substrate (bottom sample) of a carcass compound rubber (2 inch×6 inch) was used; (2) for conditioning, instead of the 24 hours at 23° C. in the ASTM method, the sample was tested at ambient condition; (3) instead of 1 inch×6 inch of rubber strip, 0.5 inch×5 inch of rubber strip was used. Average tack values from 3 replicates were reported with a typical coefficient of variation of approximately 20% or less.

The rubber-to-rubber/green tack testing was conducted using uncured pressed rubber compound samples. The uncured rubber compounds were initially placed between Mylar sheets in room temperature mold, which was then loaded in curing press set at 100° C. and pressed for 3 minutes. The pressed samples was conditioned at room temperature for at least 24 hours before tack testing. The samples with the Mylar backing were died out with mill grain along sample length. The Carcass and PEDM strip samples have a thickness of around 2±0.2 mm. The rubber test strip was backed with non-extensible tape 0.5 inch×5 inch. As directed in the method, apply rubber to carcass compound substrate with a ChemInstruments RD-3000 automated roll down machine with a 4.5 pound roller for consistent application for 2 cycle roll down. After 1 minute of contact (dwell time), removed bonded strip and measured the removal force on the ChemInstruments AR-2000— Adhesion/Release tester while maintaining a 90° peel. Removal speed was 1 inch/minute. Low tack compounds may not maintain a 90° angle. This method provides the benefit of a larger test area and longer dwell time, thus providing more extensive testing of the sample versus the Tel-Tak method.

As used herein, Shore hardness was measured according to ASTM D2240-15e1, with a 3-second delay using a Shore A scale, unless otherwise specified.

As used herein, tear strength was measured according to ASTM D624-00.

As used herein, fatigue to failure was measured according to ASTM D4482-11(2017).

A DeMattia Crack Initiation test method was used to determine crack initiation resistance by repeated bending motions between the stationary and mobile grips of the DeMattia flexing machine. As used herein, DeMattia Crack Initiation tests are based on ASTM D430-06(2018).

A DeMattia Crack growth test method was used to determine the resistance to crack growth, which is produced by repeated bending motions between the stationary and mobile grips of the DeMattia flexing machine. As used herein, the DeMattia Crack growth test method is based on ASTM D813-07(2019). The legend for the DeMattia Crack Initiation is N.C.=no crack and L.S.=layer separation.

As used herein, a peel adhesion strength represents the force required to separate the vulcanized layers of different rubber compounds (e.g., between a carcass and a sidewall compound) by means of tension machine (this is also known as 180° Peel). Test method is based on ASTM D413-98 (2017) where the test specimen width is one inch, the testing speed is 5 inch/minute, and the test is performed at room temperature. The failure mode legend is as follows: P=Plucking and I=Interfacial.

As used herein, a DIN Abrasion test measures abrasion resistance in terms of volume loss in cubic millimeters or abrasion resistance index (ARI) in percent of rubber when moving a test piece across the surface of an abrasive sheet mounted to a revolving drum. This test is based on ASTM D5963-04(2019).

As used herein, an ozone resistance test used rubber compounds in either a dumbbell or rectangle shape. The samples were exposed to ozone under static conditions at a prescribed ozone concentration (50 parts per hundred million (pphm)) and temperature (40° C.) in a chamber. The specimens were periodically examined with unaided eye or by magnification for signs of cracking. The test method used was based on ASTM D1149-18.

MOCON measurements were conducted at 40° C. and the method is based on ASTM D 3985-17.

Molecular Weight Determination by Polymer Char GPC-IR Hyphenated with Multiple Detectors: Unless otherwise indicated, the distributions and the moments of molecular weight (number average molecular weight (Mn), weight average molecular weight (Mw), and z-average molecular weight (Mz), Mw/Mn, etc.) are determined by using a high temperature Gel Permeation Chromatography (Polymer Char GPC-IR) equipped with a multiple-channel band-filter based Infrared detector IR5, an 18-angle Wyatt Dawn Heleos light scattering detector and a 4-capillary viscometer with Wheatstone bridge configuration. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degas sed with an online degas ser before entering the GPC instrument. The nominal flow rate is 1.0 ml/min and the nominal injection volume is 200 μL. The whole system including transfer lines, columns, and viscometer detector are contained in ovens maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 2 hours for the polypropylene samples. The concentration (c), at each point in the chromatogram is calculated from the baseline-subtracted IR5 broadband signal intensity (I), using the following equation: $c=\beta I$, where $\beta$ is the mass constant. The mass recovery is calculated from the ratio of the integrated area of the concentration chromatography over elution volume and the injection mass which is equal to the predetermined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{PS}=0.67$ and $K_{PS}=0.000175$ while $\alpha$ and K are for other materials as calculated from empirical equations (Sun, T. et al. Macromolecules 2001, 34, 6812). Here the concentrations are expressed in g/cm$^3$, molecular weight is expressed in g/mole, and intrinsic viscosity (hence K in the Mark-Houwink equation) is expressed in dL/g unless otherwise noted.

The LS molecular weight (M) at each point in the chromatogram is determined by analyzing the LS output using the Zimm model for static light scattering:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, A2 is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For purposes of the present disclosure and the claims thereto (dn/dc)=0.1048 for ethylene-propylene copolymers, and (dn/dc)=0.1048-0.0016ENB for EPDM comprising ENB as the diene, where ENB is the ENB content in wt % in the ethylene-propylene-diene terpolymer. Where other non-conjugated polyenes are used instead of (or in addition to) ENB, the ENB is taken as weight percent of total non-conjugated polyenes.

A high temperature Polymer Char viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output.

Herein, density of a polymer is measured at room temperature per the ASTM D1505-10 test method.

Herein, melt flow rate is measured according to the ASTM D1238-13 with a 2.16 kg weight at 230° C., unless otherwise specified.

Differential Scanning calorimetry (DSC) was used to determine glass transition temperature (Tg), melting temperature (Tm), and heat of fusion (Hf) of the polymers according to ASTM D3418-03 using a TA Instruments model Q200 machine. Samples weighing approximately 5-10 mg were kept in an aluminum sample pan and hermetically sealed. These were gradually heated to 200° C. at a rate of 10° C./minute and thereafter, held at 200° C. for 2 minutes. They were subsequently cooled to −90° C. at a rate of 10° C./minute and held isothermally for 2 minutes at −90° C. This was followed by a second heating cycle wherein the samples were heated to 200° C. at 10° C./minute. Both the first and second cycle thermal events were recorded.

During the second heating cycle, appearance of melting indicates crystallinity and thus measured heat of fusion is used to compute the crystallinity unless otherwise indicated. The thermal output, recorded as the area under the melting peak of the sample, is a measure of the heat of fusion and may be expressed in Joules per gram of polymer. The melting point is recorded as the temperature of the greatest heat absorption within the range of melting of the sample relative to a baseline measurement for the increasing heat capacity of the polymer as a function of temperature.

The percent crystallinity is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Wt % of $C_2$-$C_{16}$ olefin and wt % of diene can be measured by $^{13}$C NMR and, in some cases, by $^1$H NMR. Wt % numbers throughout this document are uncorrected numbers wherein wt % of $C_2$ plus wt % of $C_3$-$C_{16}$ olefin equals 100%, unless specifically referred to as being corrected.

For ethylene-propylene and ethylene-propylene-diene copolymers, FTIR is typically used to measure ethylene content and diene content (when present), using ASTM D3900-17 and ASTM D6047-17. The former provides uncorrected $C_2$ wt % values.

The corrected wt % of $C_2$ can be calculated from uncorrected wt % $C_2$ using the equation below:

Corrected wt % $C_2$=[uncorrected wt % $C_2\times$(100−wt % diene)]/100 where the wt % of ethylene and wt % of diene are determined by FTIR or by NMR methods.

When the $C_3$-$C_{16}$ olefin is propylene, ASTM D3900-17 is followed to determine propylene content. When the diene is ENB, ASTM D6047-17 is followed to determine ENB content. If ASTM established IR methods are not available for other $C_3$-$C_{16}$ olefins, and/or other dienes, $^{13}C$ NMR may be used.

For purposes of the present disclosure, the mole fractions of ethylene, $C_3$-$C_{16}$ olefin, and diene are calculated using the following equations A, B, and C, respectively:

$C_2$ mole fraction =

$$\frac{\frac{\text{wt \% } C_2}{Mw(C_2)}}{\frac{\text{wt \% } C_2}{Mw(C_2)} + \frac{100 - \text{wt \% } C_2 - \text{wt \% diene}}{Mw(C_3 - C_{16} \text{ olefin})} + \frac{\text{wt \% diene}}{Mw(\text{diene})}}$$

Equation (B)

$C_3$-$C_{16}$ mole fraction =

$$\frac{\frac{100 - \text{wt \% } C_2 - \text{wt \% diene}}{Mw(C_3 - C_{16} \text{ olefin})}}{\frac{\text{wt \% } C_2}{Mw(C_2)} + \frac{100 - \text{wt \% } C_2 - \text{wt \% diene}}{Mw(C_3 - C_{16} \text{ olefin})} + \frac{\text{wt \% diene}}{Mw(\text{diene})}}$$

Equation (C)

Diene mole fraction =

$$\frac{\frac{\text{wt \% diene}}{Mw(\text{diene})}}{\frac{\text{wt \% } C_2}{Mw(C_2)} + \frac{100 - \text{wt \% } C_2 - \text{wt \% diene}}{Mw(C_3 - C_{16} \text{ olefin})} + \frac{\text{wt \% diene}}{Mw(\text{diene})}}$$

where "$Mw(C_2)$" is the molecular weight of ethylene in g/mol, "$Mw(C_3$-$C_{16}$ olefin)" is the molecular weight of the $C_3$-$C_{16}$ olefin in g/mol, "Mw(diene)" is the molecular weight of diene in g/mol, and "wt % $C_2$" is corrected wt % of $C_2$.

The tacticity of an α-olefin-ethylene-diene polymer is measured by $^{13}C$ NMR. Polypropylene microstructure is determined by $^{13}C$-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}C$-NMR Method (Academic Press, New York, 1977).

The "propylene tacticity index," expressed herein as [m/r], is calculated as defined in H. N. Cheng, *Macromolecules*, 17, p. 1950 (1984). When [m/r] is 0 to less than 1.0, the polymer is generally described as syndiotactic, when [m/r] is 1.0 the polymer is atactic, and when [m/r] is greater than 1.0 the polymer is generally described as isotactic. The [m/r] region from 0 to 1.0 is a continuum with polymers having a value closer to zero being more syndiotactic and those having a value closer to one being more atactic like. The phrases "propylene tacticity index", "tacticity index" and "$C_{3+}$ olefin tacticity index" are used interchangeably.

For polypropylene, the "mm triad tacticity index" of a polymer is a measure of the relative isotacticity of a sequence of three adjacent propylene units connected in a head-to-tail configuration. More specifically, in the present invention, the mm triad tacticity index (also referred to as the "mm Fraction") of a polypropylene homopolymer or copolymer is expressed as the ratio of the number of units of meso tacticity to all of the propylene triads in the copolymer:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the possible triad configurations for three head-to-tail propylene units, shown below in Fischer projection diagrams:

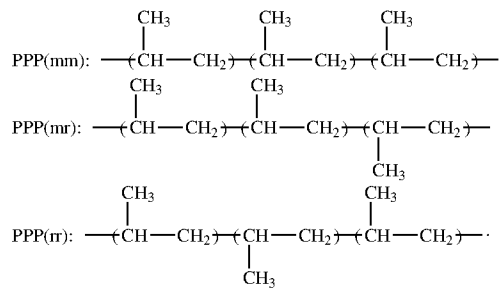

The "rr triad tacticity index" of a polymer is a measure of the relative syndiotacticity of a sequence of three adjacent propylene units connected in a head-to-tail configuration. More specifically, in the present invention, the rr triad tacticity index (also referred to as the "rr Fraction") of a polypropylene homopolymer or copolymer is expressed as the ratio of the number of units of racemic tacticity to all of the propylene triads in the copolymer:

$$rr \text{ Fraction} = \frac{PPP(rr)}{PPP(mm) + PPP(mr) + PPP(rr)}$$

The calculation of the mm Fraction of a propylene polymer is described in U.S. Pat. No. 5,504,172 (homopolymer: column 25, line 49 to column 27, line 26; copolymer: column 28, line 38 to column 29, line 67). For further information on how the mm triad tacticity can be determined from a $^{13}C$-NMR spectrum, see 1) J. A. Ewen, Catalytic Polymerization of Olefins: Proceedings of the International Symposium on Future Aspects of Olefin Polymerization, T. Keii and K. Soga, Eds. (Elsevier, 1986), pp. 271-292; and 2) U.S. Patent Application Publication No. US2004/054086 (paragraphs [0043] to [0054]).

Similarly m diads and r diads can be calculated as follows where mm, mr and rr are defined above:

$$m = mm + \tfrac{1}{2} mr$$

$$r = rr + \tfrac{1}{2} mr.$$

Preferably, the "propylene tacticity index" [m/r] of an α-olefin-ethylene-diene polymer of the present disclosure is greater than 0.30, alternatively greater than 0.40, alternatively greater than 0.50, and with an upper limit of 1.2, alternatively 1.1, alternatively, 1.0, alternatively 0.9.

Analogous calculations can be done for other $C_{3+}$ olefin polymers including those with a low content of ethylene. For further information see J. C. Randall, Polymer Reviews, "A Review of High Resolution liquid $^{13}C$ NMR Characterizations of ethylene-based polymers" (1989) 29:2 201-317.

The $^{13}C$ solution NMR was performed on a 10 mm cryoprobe with a field strength of at least 600 MHz solvent mixture of ODCB (ortho-dichlorobenzene) and benzene-d6 ($C_6D_6$) (90:10) at 120° C. with a flip angle of 90° and inverse gated decoupling with a 20 second delay. Sample preparation (polymer dissolution) was performed at 140° C. where 0.20 grams of polymer was dissolved in an appropriate amount of solvent to give a final polymer solution volume of 3 ml. Chemical shifts were referenced to the solvent signal at 127.2 ppm.

The tacticity is calculated from integrating the $CH_3$ region of the propylene unit where the regions are defined as:

| | |
|---|---|
| mm region | 21.20-20.5 ppm |
| mr region | 20.5-19.75 ppm |
| rr region | 19.75-18.7 ppm |

To account for the portion of the EP sequence that overlaps in the mr and rr regions, the CH EPE peak at 32.8 ppm and the CH EPP peak at 30.5 ppm were used to remove the EPE and EPP contribution.

| | |
|---|---|
| mm region | 21.20-20.5 ppm |
| mr region | (20.5-19.75 ppm-CH EPP) |
| rr region | (19.75-18.7 ppm-CH EPE) |

The sum or "total" of the integrals of the mm, mr and rr regions are used to calculate the percentage of mm, mr and rr triads where "total"=mm+mr+rr.

$$\% \, mm = mm*100/\text{total}$$

$$\% \, mr = mr*100/\text{total}$$

$$\% \, rr = rr*100/\text{total}$$

Regio-defects and ENB sequence effects are not accounted for in the tacticity calculation. Their contribution is assumed to be negligible.

Percent dyad, m and r, are calculated from:

$$m = \% \, mm + (0.5 * \% \, mr)$$

$$r = \% \, rr + (0.5 * \% \, mr).$$

The "propylene tacticity index", expressed herein as [m/r], is calculated from the corrected integral regions as described above. When [m/r] is 0 to less than 1.0, the polymer is generally described as syndiotactic, when [m/r] is 1.0 the polymer is atactic, and when [m/r] is greater than 1.0 the polymer is generally described as isotactic.

Numerical ranges used herein include the numbers recited in the range. For example, the numerical range "from 1 wt % to 10 wt %" includes 1 wt % and 10 wt % within the recited range.

Rubber Compounds and Tires

The rubber compounds and tire components produced therewith may comprise about 5 phr to about 50 phr (or about 5 phr to about 20 phr, or about 15 phr to about 30 phr, or about 20 phr to about 50 phr) of a PE(D)M polymer and about 50 phr to about 95 phr (or about 50 phr to about 80 phr, or about 70 phr to about 85 phr, or about 80 phr to about 95 phr) of a rubber that is not the PE(D)M polymer and, wherein the rubber and the PE(D)M polymer cumulatively are 100 phr. While a sidewall of a tire may have about 5 phr to about 50 phr of PE(D)M and about 50 phr to about 95 phr of a rubber that is not PE(D)M, preferably, the sidewall of the tire and the rubber compound therefore may comprise about 15 phr to about 50 phr (or about 15 phr to about 30 phr, or about 25 phr to about 50 phr) of a PE(D)M polymer and about 50 phr to about 85 phr (or about 50 phr to about 75 phr, or about 70 phr to about 85 phr) of a rubber that is not the PE(D)M polymer. While an inner tube of a tire may have about 5 phr to about 50 phr of PE(D)M and about 50 phr to about 95 phr of a rubber that is not PE(D)M, preferably, the inner tube of the tire and the rubber compound therefore may comprise about 5 phr to about 30 phr (or about 5 phr to about 15 phr, or about 10 phr to about 30 phr) of a PE(D)M polymer and about 70 phr to about 95 phr (or about 70 phr to about 90 phr, or about 85 phr to about 95 phr) of a rubber that is not the PE(D)M polymer. While an innerliner of a tire may have about 5 phr to about 50 phr of PE(D)M and about 50 phr to about 95 phr of a rubber that is not PE(D)M, preferably, the innerliner of the tire and the rubber compound therefore may comprise about 5 phr to about 20 phr (or about 5 phr to about 15 phr, or about 10 phr to about 20 phr) of a PE(D)M polymer and about 80 phr to about 95 phr (or about 80 phr to about 90 phr, or about 85 phr to about 95 phr) of a rubber that is not the PE(D)M polymer.

Preferably, the PE(D)M polymer comprises about 65 wt % to about 97 wt % (e.g., 65 wt % to 75 wt %, or 75 wt % to 85 wt %, or 85 wt % to 97 wt %) propylene content (derived from propylene monomers), about 0.5 wt % to about 30 wt % (e.g., 0.5 wt % to 10 wt %, or 5 wt % to 20 wt %, or 10 wt % to 30 wt %) α-olefin that is not propylene content (derived from α-olefin monomers), and 0 wt % to about 20 wt % (e.g., 0 wt %, or 1 wt % to 7 wt %, or 2.5 wt % to 10 wt %, or 5 wt % to 20 wt %) diene content (derived from diene monomers). PE(D)M polymers are described in more detail herein. While the PE(D)M in the rubber compound of a sidewall of a tire may comprise about 65 wt % to about 97 wt % propylene, about 0.5 wt % to about 30 wt % α-olefin that is not propylene, and 0 wt % to about 20 wt % diene, preferably, the PE(D)M in the rubber compound of the sidewall of the tire may comprise about 65 wt % to about 97 wt % propylene, about 1 wt % to about 30 wt % α-olefin that is not propylene, and 0 wt % to about 20 wt % diene. While the PE(D)M in the rubber compound of an inner tube of a tire may comprise about 70 wt % to about 97 wt % propylene, about 0.5 wt % to about 20 wt % α-olefin that is not propylene, and 0 wt % to about 10 wt % diene, preferably, the PE(D)M in the rubber compound of the inner tube of the tire may comprise about 65 wt % to about 97 wt % propylene, about 1 wt % to about 30 wt % α-olefin that is not propylene, and 0 wt % to about 20 wt % diene. While the PE(D)M in the rubber compound of an innerliner of a tire may comprise about 70 wt % to about 97 wt % propylene, about 0.5 wt % to about 20 wt % α-olefin that is not propylene, and 0 wt % to about 10 wt % diene, preferably, the PE(D)M in the rubber compound of the innerliner of the tire may comprise about 65 wt % to about 97 wt % propylene, about 0.5 wt % to about 30 wt % α-olefin that is not propylene, and 0 wt % to about 10 wt % diene.

Examples of rubbers suitable for compounding with the PE(D)M polymers described herein include, but are not limited to, natural rubbers (NR), polyisoprene rubber (IR), poly(styrene-co-butadiene) rubber (SBR), polybutadiene rubber (BR), poly(isoprene-co-butadiene) rubber (IBR), styrene-isoprene-butadiene rubber (SIBR), butyl rubber, star branched butyl rubber (SBBR), isobutylene-isoprene rubber (IIR), poly(isobutylene-co-alkylstyrene), a halogenated isobutylene-based rubber (e.g., bromobutyl rubber (BIIR), chlorobutyl rubber (CIIR), and brominated polymers derived from a copolymer of isobutylene and p-methylstyrene (BIMSM) elastomer), polychloroprene rubber, nitrile rubber, EP(D)M polymers, and the like, and any combination thereof. For the various tire applications, when using EP(D)M polymer in the rubber compound with PE(D)M polymers, at least one additional rubber is used.

For tire sidewall applications, the rubber used in combination with the PE(D)M polymers is preferably natural rubber, polybutadiene rubber, and any combination thereof. EP(D)M may also be included in the rubber compounds for tire sidewall applications.

For tire inner tube applications, the rubber used in combination with the PE(D)M polymers is preferably IIR, BIIR, CIIR, and any combination thereof. EP(D)M may also be included in the rubber compounds for tire sidewall applications.

For tire innerliner applications, the rubber used in combination with the PE(D)M polymers is preferably natural rubber, BIIR, CIIR, and any combination thereof. EP(D)M may also be included in the rubber compounds for tire sidewall applications.

The rubber compounds and tire components produced therewith may further comprise one or more additives (e.g., curatives, crosslinking agents, fillers, process oils, plasticizers, compatibilizers, crosslinkers, and the like).

Where curatives (e.g., crosslinking agents or vulcanizing agents) are present in a composition, the polymers/rubbers of the rubber compounds may be present in at least partially crosslinked form (that is, at least a portion of the polymer chains are crosslinked with each other). Accordingly, an at least partially crosslinked rubber compound may be made by mixing (in accordance with any suitable compounding method) a composition comprising: (a) a PE(D)M polymer and a rubber; (b) one or more vulcanization activators; (c) one or more vulcanizing agents; and, optionally, (d) one or more further additives.

Suitable vulcanization activators include zinc oxide, stearic acid, and the like. These activators may be mixed in amounts ranging from about 0.1 phr to about 20 phr. Different vulcanization activators may be present in different amounts. For instance, where the vulcanization activator includes zinc oxide, the zinc oxide may be present in an amount from about 1 phr to about 20 phr (or about 2.5 phr to about 10 phr, or about 5 phr), while stearic acid may preferably be employed in amounts ranging from about 0.1 phr to about 5 phr (or about 0.1 phr to about 2 phr, or about 1.5 phr).

Any suitable vulcanizing agent known in the art may be used. Of particular note are curing agents as described in Col. 19, line 35 to Col. 20, line 30 of U.S. Pat. No. 7,915,354, which description is hereby incorporated by reference (e.g., sulfur, peroxide-based curing agents (VUL-CUP™ 40 KE available from Arkema of Colombes, France, resin curing agents, silanes, and hydrosilane curing agents). Other examples include phenolic resin curing agents (e.g., as described in U.S. Pat. No. 5,750,625, also incorporated by reference herein). Cure co-agents may also be included (e.g., zinc dimethacrylate (ZDMA) (DYMALINK™ 708, available from Cray Valley) or those described in the already-incorporated description of U.S. Pat. No. 7,915,354).

Further additives may be chosen from any known additives useful for rubber compounds used in components of a tire, and include, among others, one or more of:

Process oil, such as paraffinic and/or isoparaffinic process oil (examples including SUNPAR™ 2280 (available from HollyFrontier Refining & Marketing LLC, Tulsa, Oklahoma); as well as FLEXON™ 876, CORE™ 600 base stock oil, FLEXON™ 815, and CORE™ 2500 base stock oil, available from ExxonMobil Chemical Company. For example, where color of the end product may be important, a white oil (e.g., API Group II or Group III base oil) may be used as process oil. Examples include paraffinic and/or isoparaffinic oils with low (under 1 wt %, preferably under 0.1 wt %) aromatic and heteroatom content. Rubber compounds and resultant tire components of the present disclosure may comprise process oil from 1 phr to 150 phr, or 50 phr to 100 phr, or 60 phr to 80 phr, or, for sponge grades, from 50 phr to 200 phr, or 70 phr to 150 phr, or 80 phr to 100 phr, and preferred process oils have viscosity at 40° C. from 80 CSt to 600 CSt;

Vulcanization accelerators: Rubber compounds and resultant tire components of the present disclosure can comprise 0.1 phr to 15 phr, or 1 phr to 5 phr, or 2 phr to 4 phr, with examples including thiazoles such as 2-mercaptobenzothiazole or mercaptobenzothiazyl disulfide (MBTS); guanidines such as diphenylguanidine; sulfenamides such as N-cyclohexylbenzothiazol-sulfenamide; dithiocarbamates such as zinc dimethyl dithiocarbamate, zinc diethyl dithiocarbamate, zinc dibenzyl dithiocarbamate (ZBEC); and zinc dibutyldithiocarbamate, thioureas such as 1,3-diethylthiourea, thiophosphates and others;

Processing aids (e.g., polyethylene glycol or zinc soap);

Carbon black (e.g., having particle size from 20 nm to 600 nm and structure having DBPA (dibutyl phthalate absorption number) within the range from 0 to 150, as measured by the DBP method. Rubber compounds and resultant tire components of the present disclosure may comprise carbon black from 1 phr to 500 phr, preferably from 1 phr to 200 phr, or from 50 phr to 150 phr;

Mineral fillers (talc, calcium carbonate, clay, silica, aluminum trihydrate, and the like), which may be present in the composition from 1 phr to 200 phr, preferably from 20 phr to 100 phr, or from 30 phr to 60 phr;

Where foaming may be desired, sponge or foaming grade additives, such as foaming agent or blowing agent, particularly with a very high Mooney viscosity, such as those suitable for sponge grades. Examples of such agents include: azodicarbonamide (ADC), ortho-benzo sulfonyl hydrazide (OBSH), p-toluenesulfonylhydrazide (TSH), 5-phenyltetrazole (5-PT), and sodium bicarbonate in citric acid. Microcapsules may also or instead be used for such foaming applications. These may include a thermo-expandable microsphere comprising a polymer shell with a propellant contained therein. Examples are known in the art and described in, for example, U.S. Pat. Nos. 6,582,633 and 3,615,972, WIPO Publication Nos. WO 99/46320 and WO 99/43758, and the contents of which hereby are incorporated by reference. Examples of such thermo-expandable microspheres include EXPANCEL™ products commercially available from Akzo Nobel N.V., and ADVANCELL™ products available from Sekisui. Sponging or foaming may be accomplished by direct injection of gas and/or liquid (e.g., water, $CO_2$, $N_2$) into the rubber in an extruder, for foaming after passing the composition through a die; and Various other additives may also be included, such as antioxidants (e.g., 1,2-dihydro-2,2,4-trimethylquinoline), stabilizers, anticorrosion agents, UV absorbers, antistatics, slip agents, moisture absorbents (e.g., calcium oxide), pigments, dyes or other colorants.

The at least partially crosslinked rubber compounds and resultant tire components of the present disclosure are formed by mixing the above-described components in any suitable manner described in the Polymer Blending section above (e.g. BANBURY™ mixer). Mixing may include any one or more of typical mixing processes for rubber compounds, such as open mill mixing, mixing using internal mixers or kneaders, and extrusion (e.g., through a twin-screw extruder).

Further, additives may be incorporated into a polymer blend directly or as part of a master batch, i.e., an additive package containing several additives to be added at one time in predetermined proportions. The master batch may be added in any suitable amount. For example, a master batch comprising an additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the master batch. This is a common practice in polymer processing, typically used for addition of color, additives, and fillers to final compositions. Dispersion (or "letdown") of the master batch may take place as part of a processing step used to fabricate articles, such as in the extruder on an injection molding machine or on a continuous extrusion line, or during a separate compounding step.

The rubber compounds described herein comprising the PE(D)M and rubber can have a Mooney viscosity (ML 1+4) of about 30 MU to about 100 MU (or about 30 MU to about 50 MU, or about 40 MU to about 75 MU, or about 60 MU to about 100 MU). While the Mooney viscosity (ML 1+4) for a rubber compound for the sidewall of a tire may be about 30 MU to about 100 MU, preferably, for the sidewall, the rubber compound has a Mooney viscosity (ML 1+4) of about 30 MU to about 60 MU (or about 30 MU to about 50 MU, or about 40 MU to about 60 MU). While the Mooney viscosity (ML 1+4) for a rubber compound for the inner tube of a tire may be about 30 MU to about 100 MU, preferably, for the inner tube, the rubber compound has a Mooney viscosity (ML 1+4) of about 45 MU to about 75 MU (or about 45 MU to about 65 MU, or about 60 MU to about 75 MU). While the Mooney viscosity (ML 1+4) for a rubber compound for the innerliner of a tire may be about 30 MU to about 100 MU, preferably, for the innerliner, the rubber compound has a Mooney viscosity (ML 1+4) of about 50 MU to about 100 MU (or about 50 MU to about 80 MU, or about 70 MU to about 100 MU).

Again, the PICMA tack test method cannot measure a PICMA tack greater than 1.5 kgf. The rubber compounds described herein comprising the PE(D)M and rubber can have a PICMA tack of about 0.9 kgf or greater (or about 0.9 kgf to about 1.5 kgf, or too high to be measured). While the PICMA tack for a rubber compound for the sidewall of a tire may be about 0.9 kgf or greater, preferably, for the sidewall, the rubber compound has a PICMA tack of about 1.2 kg or greater (or about 1.2 kgf to about 1.5 kgf, or too high to be measured). While the PICMA tack for a rubber compound for the inner tube of a tire may be about 0.9 kgf or greater, preferably, for the inner tube, the rubber compound has a PICMA tack of about 0.9 kgf to about 1.5 kgf. While the PICMA tack for a rubber compound for the innerliner of a tire may be about 0.9 kgf or greater, preferably, for the innerliner, the rubber compound has a PICMA tack of about 0.9 kgf to about 1.5 kgf.

The rubber compounds described herein comprising the PE(D)M and rubber can have 180° peel strength after curing at 160° C. for 8 minutes of about 3 kgf/cm to about 25 kgf/cm (or about 3 kgf/cm to about 15 kgf/cm, or about 10 kgf/cm to about 25 kgf/cm). Preferably, for the sidewall of a tire, the rubber compound has a 180° peel strength after curing at 160° C. for 8 minutes of about 3 kgf/cm to about 25 kgf/cm (or about 3 kgf/cm to about 15 kgf/cm, or about 10 kgf/cm to about 25 kgf/cm). Preferably, for the inner tube of a tire, the rubber compound has a 180° peel strength after curing at 160° C. for 8 minutes of about 3 kgf/cm to about 25 kgf/cm (or about 3 kgf/cm to about 15 kgf/cm, or about 10 kgf/cm to about 25 kgf/cm). Preferably, for the innerliner of a tire, the rubber compound has a 180° peel strength after curing at 160° C. for 8 minutes of about 3 kgf/cm to about 25 kgf/cm (or about 3 kgf/cm to about 15 kgf/cm, or about 10 kgf/cm to about 25 kgf/cm).

The rubber compounds described herein comprising the PE(D)M and rubber can have a Shore A hardness after curing at 160° C. for 8 minutes of about 40 to about 70 (or about 40 to about 55, or about 50 to about 65, or about 55 to about 70). While the Shore A hardness after curing at 160° C. for 8 minutes for a rubber compound for the sidewall of a tire may be about 40 to about 70, preferably, for the sidewall, the rubber compound has a Shore A hardness after curing at 160° C. for 8 minutes of about 55 to about 70 (or about 55 to about 65, or about 60 to about 70). While the Shore A hardness after curing at 160° C. for 8 minutes for a rubber compound for the inner tube of a tire may be about 40 to about 70, preferably, for the inner tube, the rubber compound has a Shore A hardness after curing at 160° C. for 8 minutes of about 55 to about 65 (or about 55 to about 60, or about 60 to about 65). While the Shore A hardness after curing at 160° C. for 8 minutes for a rubber compound for the innerliner of a tire may be about 40 to about 70, preferably, for the innerliner, the rubber compound has a Shore A hardness after curing at 160° C. for 8 minutes of about 40 to about 60 (or about 40 to about 55, or about 45 to about 60).

The rubber compounds described herein comprising the PE(D)M and rubber can have a Shore A hardness after curing at 160° C. for 8 minutes then aging at 125° C. for about 3 days of about 55 to about 80 (or about 55 to about 65, or about 60 to about 75, or about 65 to about 80). While the Shore A hardness after curing at 160° C. for 8 minutes aging at 125° C. for about 3 days for a rubber compound for the sidewall of a tire may be about 55 to about 80, preferably, for the sidewall, the rubber compound has a Shore A hardness after curing at 160° C. for 8 minutes aging at 125° C. for about 3 days of about 65 to about 80 (or about 65 to about 75, or about 70 to about 80). While the Shore A hardness after curing at 160° C. for 8 minutes aging at 125° C. for about 3 days for a rubber compound for the inner tube of a tire may be about 55 to about 80, preferably, for the inner tube, the rubber compound has a Shore A hardness after curing at 160° C. for 8 minutes aging at 125° C. for about 3 days of about 55 to about 65 (or about 55 to about 60, or about 60 to about 65). While the Shore A hardness after curing at 160° C. for 8 minutes aging at 125° C. for about 3 days for a rubber compound for the innerliner of a tire may be about 55 to about 80, preferably, for the innerliner, the rubber compound has a Shore A hardness after curing at 160° C. for 8 minutes aging at 125° C. for about 3 days of about 55 to about 70 (or about 55 to about 65, or about 60 to about 70).

The rubber compounds described herein comprising the PE(D)M and rubber can have a modulus at 100% elongation after curing at 160° C. for 8 minutes of about 0.7 MPa to about 4 MPa (or about 0.7 MPa to about 2 MPa, or about 1 MPa to about 3 MPa, or about 2 MPa to about 4 MPa). While the modulus at 100% elongation after curing at 160° C. for 8 minutes for a rubber compound for the sidewall of a tire may be about 0.7 MPa to about 4 MPa, preferably, for the sidewall, the rubber compound has a modulus at 100% elongation after curing at 160° C. for 8 minutes of about 2 MPa to about 4 MPa (or about 2 MPa to about 3.5 MPa, or about 2.5 MPa to about 4 MPa). While the modulus at 100% elongation after curing at 160° C. for 8 minutes for a rubber compound for the inner tube of a tire may be about 0.7 MPa to about 4 MPa, preferably, for the inner tube, the rubber compound has a modulus at 100% elongation after curing at 160° C. for 8 minutes of about 2 MPa to about 3 MPa (or about 2 MPa to about 2.5 MPa, or about 2.5 MPa to about 3 MPa). While the modulus at 100% elongation after curing at 160° C. for 8 minutes for a rubber compound for the innerliner of a tire may be about 0.7 MPa to about 4 MPa, preferably, for the innerliner, the rubber compound has a modulus at 100% elongation after curing at 160° C. for 8 minutes of about 0.7 MPa to about 3 MPa (or about 0.7 MPa to about 2 MPa, or about 1.5 MPa to about 3 MPa).

The rubber compounds described herein comprising the PE(D)M and rubber can have a modulus at 100% elongation after curing at 160° C. for 8 minutes then aging at 125° C. for about 3 days of about 1 MPa to about 7 MPa (or about 1 MPa to about 4 MPa, or about 2 MPa to about 6 MPa, or about 4 MPa to about 7 MPa). While the modulus at 100% elongation after curing at 160° C. for 8 minutes then aging at 125° C. for about 3 days for a rubber compound for the sidewall of a tire may be about 1 MPa to about 7 MPa, preferably, for the sidewall, the rubber compound has a modulus at 100% elongation after curing at 160° C. for 8 minutes then aging at 125° C. for about 3 days of about 4 MPa to about 7 MPa (or about 4 MPa to about 6 MPa, or about 5 MPa to about 7 MPa). While the modulus at 100% elongation after curing at 160° C. for 8 minutes then aging at 125° C. for about 3 days for a rubber compound for the inner tube of a tire may be about 1 MPa to about 7 MPa, preferably, for the inner tube, the rubber compound has a modulus at 100% elongation after curing at 160° C. for 8 minutes then aging at 125° C. for about 3 days of about 1 MPa to about 4 MPa (or about 1 MPa to about 3 MPa, or about 2 MPa to about 4 MPa). While the modulus at 100% elongation after curing at 160° C. for 8 minutes then aging at 125° C. for about 3 days for a rubber compound for the innerliner of a tire may be about 1 MPa to about 7 MPa, preferably, for the innerliner, the rubber compound has a modulus at 100% elongation after curing at 160° C. for 8 minutes then aging at 125° C. for about 3 days of about 1 MPa to about 5 MPa (or about 1 MPa to about 4 MPa, or about 2 MPa to about 5 MPa).

The rubber compounds described herein comprising the PE(D)M and rubber can have a tensile strength after curing at 160° C. for 8 minutes of about 7 MPa to about 20 MPa (or about 7 MPa to about 15 MPa, or about 10 MPa to about 20 MPa). Preferably, for the sidewall, the rubber compound has a tensile strength after curing at 160° C. for 8 minutes of about 7 MPa to about 20 MPa (or about 2 MPa to about 3.5 MPa, or about 2.5 MPa to about 4 MPa). While the tensile strength after curing at 160° C. for 8 minutes for a rubber compound for the inner tube of a tire may be about 7 MPa to about 20 MPa, preferably, for the inner tube, the rubber compound has a tensile strength after curing at 160° C. for 8 minutes of about 7 MPa to about 15 MPa (or about 7 MPa to about 12 MPa, or about 10 MPa to about 15 MPa). While the tensile strength after curing at 160° C. for 8 minutes for a rubber compound for the innerliner of a tire may be about 7 MPa to about 20 MPa, preferably, for the innerliner, the rubber compound has a tensile strength after curing at 160° C. for 8 minutes of about 7 MPa to about 15 MPa (or about 7 MPa to about 12 MPa, or about 10 MPa to about 15 MPa).

The rubber compounds described herein comprising the PE(D)M and rubber can have a tensile strength after curing at 160° C. for 8 minutes then aging at 125° C. for about 3 days of about 5 MPa to about 15 MPa (or about 5 MPa to about 10 MPa, or about 10 MPa to about 15 MPa). While the tensile strength after curing at 160° C. for 8 minutes then aging at 125° C. for about 3 days for a rubber compound for the sidewall of a tire may be about 5 MPa to about 15 MPa, preferably, for the sidewall, the rubber compound has a tensile strength after curing at 160° C. for 8 minutes then aging at 125° C. for about 3 days of about 5 MPa to about 12 MPa (or about 5 MPa to about 10 MPa, or about 8 MPa to about 12 MPa). While the tensile strength after curing at 160° C. for 8 minutes then aging at 125° C. for about 3 days for a rubber compound for the inner tube of a tire may be about 5 MPa to about 15 MPa, preferably, for the inner tube, the rubber compound has a tensile strength after curing at 160° C. for 8 minutes then aging at 125° C. for about 3 days of about 5 MPa to about 12 MPa (or about 5 MPa to about 10 MPa, or about 8 MPa to about 12 MPa). Preferably, for the innerliner, the rubber compound has a tensile strength after curing at 160° C. for 8 minutes then aging at 125° C. for about 3 days of about 5 MPa to about 15 MPa (or about 5 MPa to about 12 MPa, or about 8 MPa to about 15 MPa).

The rubber compounds described herein comprising the PE(D)M and rubber can have an elongation at break after curing at 160° C. for 8 minutes of about 250% to about 800% (or about 250% to about 450%, or about 450% to about 600%, or about 400% to about 800%). While the elongation at break after curing at 160° C. for 8 minutes for a rubber compound for the sidewall of a tire may be about 250% to about 800%, preferably, for the sidewall, the rubber compound has a elongation at break after curing at 160° C. for 8 minutes of about 250% to about 500% (or about 250% to about 400%, or about 350% to about 500%). While the elongation at break after curing at 160° C. for 8 minutes for a rubber compound for the inner tube of a tire may be about 250% to about 800%, preferably, for the inner tube, the rubber compound has a elongation at break after curing at 160° C. for 8 minutes of about 450% to about 650% (or about 450% to about 600%, or about 500% to about 650%). While the elongation at break after curing at 160° C. for 8 minutes for a rubber compound for the innerliner of a tire may be about 250% to about 800%, preferably, for the innerliner, the rubber compound has a elongation at break after curing at 160° C. for 8 minutes of about 400% to about 800% (or about 400% to about 650%, or about 600% to about 800%).

The rubber compounds described herein comprising the PE(D)M and rubber can have an elongation at break after curing at 160° C. for 8 minutes then aging at 125° C. for about 3 days of about 50% to about 600% (or about 50% to about 300%, or about 250% to about 450%, or about 300% to about 600%). While the elongation at break after curing at 160° C. for 8 minutes then aging at 125° C. for about 3 days for a rubber compound for the sidewall of a tire may be about 50% to about 600%, preferably, for the sidewall, the rubber compound has a elongation at break after curing at 160° C. for 8 minutes then aging at 125° C. for about 3 days of about 50% to about 250% (or about 50% to about 200%, or about 150% to about 250%). While the elongation at break after curing at 160° C. for 8 minutes then aging at 125° C. for about 3 days for a rubber compound for the inner tube of a tire may be about 50% to about 600%, preferably, for the inner tube, the rubber compound has a elongation at break after curing at 160° C. for 8 minutes then aging at 125° C. for about 3 days of about 300% to about 500% (or about 300% to about 450%, or about 350% to about 500%). While the elongation at break after curing at 160° C. for 8 minutes then aging at 125° C. for about 3 days for a rubber compound for the innerliner of a tire may be about 50% to about 600%, preferably, for the innerliner, the rubber compound has a elongation at break after curing at 160° C. for 8 minutes then aging at 125° C. for about 3 days of about 300% to about 600% (or about 300% to about 500%, or about 450% to about 600%).

The rubber compounds described herein comprising the PE(D)M and rubber can have an energy at break after curing at 160° C. for 8 minutes of about 3 J to about 10 J (or about 3 J to about 7 J, or about 5 J to about 10 J). Preferably, for the sidewall, the rubber compound has an energy at break after curing at 160° C. for 8 minutes of about 3 J to about 10 J (or about 3 J to about 7 J, or about 5 J to about 10 J). Preferably, for the inner tube, the rubber compound has an energy at break after curing at 160° C. for 8 minutes of about 3 J to about 10 J (or about 3 J to about 7 J, or about 5 J to about 10 J). Preferably, for the innerliner, the rubber compound has an energy at break after curing at 160° C. for 8 minutes of about 3 J to about 10 J (or about 3 J to about 7 J, or about 5 J to about 10 J).

The rubber compounds described herein comprising the PE(D)M and rubber can have an energy at break after curing at 160° C. for 8 minutes then aging at 125° C. for about 3 days of about 10 J to about 20 J (or about 10 J to about 17 J, or about 15 J to about 20 J). Preferably, for the sidewall, the rubber compound has an energy at break after curing at 160° C. for 8 minutes then aging at 125° C. for about 3 days of about 10 J to about 20 J (or about 10 J to about 17 J, or about 15 J to about 20 J). Preferably, for the inner tube, the rubber compound has an energy at break after curing at 160° C. for 8 minutes then aging at 125° C. for about 3 days of about 10 J to about 20 J (or about 10 J to about 17 J, or about 15 J to about 20 J). Preferably, for the innerliner, the rubber compound has an energy at break after curing at 160° C. for 8 minutes then aging at 125° C. for about 3 days of about 10 J to about 20 J (or about 10 J to about 17 J, or about 15 J to about 20 J).

The rubber compounds described herein comprising the PE(D)M and rubber can have an abrasion loss after curing at 160° C. for 8 minutes of about 100 mm$^3$ to about 200 mm$^3$ (or about 100 mm$^3$ to about 165 mm$^3$, or about 145 mm$^3$ to about 200 mm$^3$). Preferably, for the sidewall, the rubber compound has an abrasion loss after curing at 160° C. for 8 minutes of about 100 mm$^3$ to about 200 mm$^3$ (or about 100 mm$^3$ to about 165 mm$^3$, or about 145 mm$^3$ to about 200 mm$^3$).

The rubber compounds described herein comprising the PE(D)M and rubber can have a permeance coefficient after curing at 160° C. for 8 minutes of about 1 cc/(m$^2$·day·mm·Hg) to about 4 cc/(m$^2$·day·mm·Hg) (or about 1 cc/(m$^2$·day·mm·Hg) to about 3 cc/(m$^2$·day·mm·Hg), or about 2 cc/(m$^2$·day·mm·Hg) to about 4 cc/(m$^2$·day·mm·Hg)).

Preferably, for the inner tube, the rubber compound has a permeance coefficient after curing at 160° C. for 8 minutes of about 1 cc/(m$^2$·day·mm·Hg) to about 4 cc/(m$^2$·day·mm·Hg) (or about 1 cc/(m$^2$·day·mm·Hg) to about 3 cc/(m$^2$·day·mm·Hg), or about 2 cc/(m$^2$·day·mm·Hg) to about 4 cc/(m$^2$·day·mm·Hg)).

The rubber compounds described herein comprising the PE(D)M and rubber can have a tear resistance after curing at 160° C. for 8 minutes of about 25 N/mm to about 50 N/mm (or about 25 N/mm to about 40 N/mm, or about 35 N/mm to about 50 N/mm). While the tear resistance after curing at 160° C. for 8 minutes for a rubber compound for the inner tube of a tire may be about 25 N/mm to about 50 N/mm, preferably, for the inner tube, the rubber compound has a tear resistance after curing at 160° C. for 8 minutes of about 25 N/mm to about 40 N/mm (or about 25 N/mm to about 35 N/mm, or about 35 N/mm to about 40 N/mm). While the tear resistance after curing at 160° C. for 8 minutes for a rubber compound for the innerliner of a tire may be about 25 N/mm to about 50 N/mm, preferably, for the innerliner, the rubber compound has a tear resistance after curing at 160° C. for 8 minutes of about 30 N/mm to about 50 N/mm (or about 30 N/mm to about 45 N/mm, or about 35 N/mm to about 50 N/mm).

The rubber compounds described herein comprising the PE(D)M and rubber can have a tear resistance after curing at 160° C. for 8 minutes then aging at 125° C. for about 3 days of about 20 N/mm to about 55 N/mm (or about 20 N/mm to about 30 N/mm, or about 30 N/mm to about 55 N/mm). While the tear resistance after curing at 160° C. for 8 minutes then aging at 125° C. for about 3 days for a rubber compound for the inner tube of a tire may be about 20 N/mm to about 55 N/mm, preferably, for the inner tube, the rubber compound has a tear resistance after curing at 160° C. for 8 minutes then aging at 125° C. for about 3 days of about 20 N/mm to about 35 N/mm (or about 20 N/mm to about 30 N/mm, or about 25 N/mm to about 35 N/mm). While the tear resistance after curing at 160° C. for 8 minutes for a rubber compound for the innerliner of a tire may be about 20 N/mm to about 55 N/mm, preferably, for the innerliner, the rubber compound has a tear resistance after curing at 160° C. for 8 minutes of about 30 N/mm to about 55 N/mm (or about 30 N/mm to about 45 N/mm, or about 40 N/mm to about 55 N/mm).

The rubber compounds described herein comprising the PE(D)M and rubber may have an ozone resistance such that the sample exhibits no cracking after exposure to 50 pphm ozone at 40° C. for about 4 hours to about 200 hours (or about 4 hours to about 72 hours, or about 12 hours to about 96 hours, or about 24 hours to about 96 hours, or about 48 hours to about 200 hours). While said ozone resistance for a rubber compound for the sidewall of a tire may be about 4 hours to about 200 hours, preferably, for the sidewall, the rubber compound has an ozone resistance such that the sample exhibits no cracking after exposure to 50 pphm ozone at 40° C. for about 4 hours to about 120 hours (or about 4 hours to about 72 hours, or about 12 hours to about 96 hours, or about 24 hours to about 120 hours). While said ozone resistance for a rubber compound for the inner tube of a tire may be about 4 hours to about 200 hours, preferably, for the inner tube, the rubber compound has an ozone resistance such that the sample exhibits no cracking after exposure to 50 pphm ozone at 40° C. for about 12 hours to about 120 hours (or about 12 hours to about 72 hours, or about 12 hours to about 96 hours, or about 24 hours to about 96 hours, or about 48 hours to about 200 hours).

The rubber compounds described herein comprising the PE(D)M and rubber may have an ozone resistance such that the sample is not broken after exposure to 50 pphm ozone at 40° C. for about 4 hours to about 200 hours (or about 4 hours to about 72 hours, or about 12 hours to about 96 hours, or about 24 hours to about 96 hours, or about 48 hours to about 200 hours). While said ozone resistance for a rubber compound for the sidewall of a tire may be about 4 hours to about 200 hours, preferably, for the sidewall, the rubber compound has an ozone resistance such that the sample is not broken after exposure to 50 pphm ozone at 40° C. for about 4 hours to about 120 hours (or about 4 hours to about 72 hours, or about 12 hours to about 96 hours, or about 24 hours to about 120 hours). While said ozone resistance for a rubber compound for the inner tube of a tire may be about 4 hours to about 200 hours, preferably, for the inner tube, the rubber compound has an ozone resistance such that the sample is not broken after exposure to 50 pphm ozone at 40° C. for about 12 hours to about 120 hours (or about 12 hours to about 72 hours, or about 12 hours to about 96 hours, or about 24 hours to about 96 hours, or about 48 hours to about 200 hours).

PE(D)M Polymers

PE(D)M polymers of the present disclosure have from 0 wt % to about 20 wt % polyene (preferably diene) content, about 0.5 wt % to about 35 wt % $C_2$ or $C_4$ to $C_{16}$ α-olefin (preferably ethylene) content, and about 65 wt % to about 99.5 wt % propylene content, said wt %, based on the weight of the PE(D)M polymer.

Rubber compounds and resultant tire components described herein can comprise a single PE(D)M polymer or a mixture of two or more PE(D)M polymers (e.g., a dual reactor product).

PE(D)M polymers of the present disclosure comprise about 65 wt % to about 99.5 wt %, based on the weight of the PE(D)M polymer. Other preferred ranges of propylene content include from 65 wt % to 80 wt %, or 75 wt % to 95 wt %, or 80 wt % to 99.5 wt %, based on the weight of the PE(D)M polymer.

PE(D)M polymers of the present disclosure comprise about 0.5 wt % to about 35 wt % $C_2$ or $C_4$ to $C_{16}$ α-olefin comonomer (preferably ethylene), based on the weight of the PE(D)M polymer. Other preferred ranges of α-olefin (e.g., ethylene) content include from 0.5 wt % to 20 wt %, or 2.5 wt % to 15 wt %, or 20 wt % to 35 wt %, based on the weight of the PE(D)M polymer. $C_2$ or $C_4$ to $C_{16}$ α-olefin comonomers include, but are not limited to, ethylene, butylene, pentylene, hexylene, heptylene, octylene, nonylene, decylene, undecylene, dodecylene, and branched isomers thereof. Ethylene is particularly preferred.

PE(D)M polymers of the present disclosure comprise a polyene content (preferably diene content) of 0 wt % to about 20 wt %, or 0 wt %, or 0.5 wt % to 5 wt %, or 2.5 wt % to 10 wt %, or 5 wt % to 20 wt %, based on the weight of the PE(D)M polymer. For example, the diene is 5-ethylidene-2-norbornene content in an amount of 0.5 wt % to 10 wt %, or 1.5 wt % to 10 wt %, or 2.5 wt % to 10 wt %, based on the weight of the PE(D)M polymer. The polyenes, as noted, are preferably (but not necessarily) dienes. Suitable dienes may be conjugated or non-conjugated. Preferably, the dienes are non-conjugated. Dienes include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB.

PE(D)M polymers of the present disclosure may have a weight average molecular weight (Mw) of 5,000,000 or less, a number average molecular weight (Mn) of 3,000,000 or less, and/or a z-average molecular weight (Mz) of 10,000,000 or less.

PE(D)M polymers of the present disclosure may have an Mw of from 5,000 g/mol to 5,000,000 g/mol, or from 10,000 g/mol to 1,000,000 g/mol, or from 20,000 g/mol to 500,000 g/mol, or from 50,000 g/mol to 400,000 g/mol. The PE(D)M polymer may have an Mn of 2,500 g/mol to 2,500,000 g/mol, or from 5,000 g/mol to 500,000 g/mol, or from 10,000 g/mol to 250,000 g/mol, or from 25,000 g/mol to 200,000 g/mol. The PE(D)M polymer may have an Mz of 10,000 g/mol to 7,000,000 g/mol, or from 50,000 g/mol to 1,000,000 g/mol, or from 80,000 g/mol to 700,000 g/mol, or from 100,000 g/mol to 500,000 g/mol.

The polydispersity index (PDI=(Mw/Mn)) of PE(D)M polymers of the present disclosure may be from 1.5 to 40. For example, a PE(D)M polymer may have an PDI from 1.5 to 40, or from 1.8 to 20, or from 2.0 to 10, or from 2.0 to 5, or from 2.0 to 3.0, or from 3 to 4.5. For example, the PDI of a PE(D)M polymer is 1.8 to 5, or from 1.8 to 3.

The ratio of Mw/Mz of PE(D)M polymers of the present disclosure may be from 1.5 to 3.0, or from 1.5 to 2.5, or from 1.75 to 2.25.

PE(D)M polymers of the present disclosure may have a Mooney viscosity (ML, 1+4 @ 125° C.) of 10 MU to 60 MU, or 10 MU to 20 MU, or 10 MU to 30 MU, or 20 MU to 40 MU, or 25 MU to 50 MU, or 30 MU to 60 MU.

PE(D)M polymers of the present disclosure can have a heat of fusion (Hf) of less than 1 J/g. For example, PE(D)M polymers are amorphous. Additionally or alternatively, PE(D)M polymers can have atactic propylene sequences. PE(D)M polymers of the present disclosure may have a glass transition temperature (Tg) from −45° C. to −2° C., or from −35° C. to −30° C. PE(D)M polymers of the present disclosure may have a Hf of less than 1 J/g and syndiotactic r diads where the percentage of r diads is low enough to still be substantially amorphous (i.e., have the low Hf).

The PE(D)M polymers of the present disclosure may have a Tg (° C.) greater than or equal to −7.386−(87.98*E)+(294*D) and less than or equal to −1.386−(87.98*E)+(294*D) wherein E is the mole fraction of ethylene in the polymer and D is the mole fraction of diene in the polymer. The PE(D)M polymers of the present disclosure may have a Tg (° C.) greater than or equal to −6.886−(87.98*E)+(294*D) and less than or equal to −1.886−(87.98*E)+(294*D) wherein E is the mole fraction of ethylene in the polymer and D is the mole fraction of diene in the polymer.

PE(D)M polymers of the present disclosure preferably have atactic polypropylene sequences. Also or instead, they are preferably amorphous, meaning they will exhibit no melting peak when subjected to differential scanning calorimetry (DSC) testing. Alternatively, PE(D)M polymers of the present disclosure may exhibit minor melting peak, such that they may be observed to have Hf<1 J/g according to the DSC methodology described herein. Further, where a PE(D)M exhibits any melting peak, such peak may be a single peak, or the PE(D)M may show secondary melting peaks adjacent to the principal peak. For purposes herein, such secondary melting peaks are considered together as a single melting point, with the highest of these peaks (relative to baseline as described herein) being considered as the melting point of the PE(D)M polymer.

The crystallinity of PE(D)M polymers may be expressed in terms of percentage of crystallinity (i.e., % crystallinity), as determined according to the DSC procedure described herein. Although PE(D)M are preferably amorphous (and may therefore be said to have 0% crystallinity), PE(D)M polymers of the present disclosure may exhibit crystallinity, preferably a % crystallinity of from 0.1% to 5%, preferably 0.1% to 3%. (The degree of crystallinity is determined by dividing (i) heat of fusion measured by (ii) the heat of fusion for 100% crystalline polyethylene, which has the value of 293 J/g (B. Wunderlich, Thermal Analysis, Academic Press, 1990, pp. 417-431).)

Further, as mentioned above, where the sample exhibits no melting peak, as in the case of amorphous polymers, it may be said to have no Hf. However, even some amorphous or near-amorphous PE(D)M samples might exhibit a minor melting peak, e.g., such that Hf on the first melt may be observed as <1 J/g. Therefore, for purposes of the present application, a PE(D)M may be considered amorphous when it has Hf<1 J/g, or alternatively when it exhibits no discernable melting peak. For example, PE(D)M copolymers described herein may have a Hf, as measured from the first heating cycle after annealing for example at 140° C. for 5 minutes and then aging at room temperature for 1 hour, or 1 day, or 1 week, or 4 weeks by the DSC procedure described herein of <1 J/g.

Additional Rubbers

Compositions of the present disclosure may comprise PE(D)M polymers and a rubber (e.g., NR, IR, SBR, BR, IBR, SIBR, butyl rubber, SBBR, IIR, poly(isobutylene-co-alkylstyrene), a halogenated isobutylene-based rubber, polychloroprene rubber, nitrile rubber, EP(D)M polymers, and the like, and any combination thereof).

Butyl rubbers can be described as random copolymers of a C4 to C7 isomonoolefin derived unit, such as isobutylene derived unit, and at least one other polymerizable unit. Butyl rubbers can be prepared by reacting a mixture of monomers, the mixture having at least (1) a C4 to C7 isoolefin monomer component such as isobutylene with (2) a multiolefin, monomer component. The isoolefin is in a range from about 70 wt % to about 99.5 wt % (or about 85 wt % to about 99.5 wt %) by weight of the total monomer mixture. The multiolefin component is present in the monomer mixture from about 30 wt % to about 0.5 wt % (or about 15 wt % to about 0.5 wt %, or about 8 wt % to 0.5 wt %).

The isoolefin is a C4 to C7 compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a C4 to C14 multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in U.S. Pat. No. 5,162,425. Other polymerizable monomers such as styrene and dichlorostyrene are also suitable for homopolymerization or copolymerization in butyl rubbers. The butyl rubber polymer can be obtained by reacting about 95 wt % to about 99.5 wt % of isobutylene with about 0.5 wt % to about 8 wt % (or about 0.5 wt % to about 5.0 wt %) isoprene. Butyl rubbers and methods of their production are described in detail in, for example, U.S. Pat. Nos. 2,356,128, 3,968,076, 4,474,924, 4,068,051 and 5,532,312. See also, WO 2004/058828, WO 2004/058827, WO 2004/058835, WO 2004/058836, WO 2004/058825, WO 2004/067577 and WO 2004/058829.

A commercial example of a desirable butyl rubber is EXXON™ BUTYL Grades of poly(isobutylene-co-isoprene), having a Mooney viscosity of from 32±2 to 51±5 (ML 1+8 at 125° C.) (available from ExxonMobil Chemical Company). Another commercial example of a desirable butyl-type rubber is VISTANEX™ polyisobutylene rubber having a molecular weight viscosity average of from $0.9\pm0.15\times10^6$ to $2.11\pm0.23\times10^6$ (available from ExxonMobil Chemical Company).

Branched or star-branched butyl rubbers are described in, for example, EP 0 678 529 B1, U.S. Pat. Nos. 5,182,333 and 5,071,913. For example, the SBBR is a composition of a butyl rubber, either halogenated or not, and a polydiene or block copolymer, either halogenated or not. The polydienes/block copolymer, or branching agents (hereinafter "polydienes"), are typically cationically reactive and are present during the polymerization of the butyl or halogenated butyl rubber, or can be blended with the butyl rubber to form the SBBR. The branching agent or polydiene can be any suitable branching agent.

For example, the SBBR can be a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, EPDM, EPR, styrene-butadiene-styrene and styrene-isoprene-styrene block copolymers. These polydienes are present, based on the monomer wt %, greater than about 0.3 wt % (or about 0.3 wt % to about 3 wt %, or about 0.4 wt % to about 2.7 wt %). A commercially available example of the SBBR is SB Butyl 4266 (ExxonMobil Chemical Company), having a Mooney viscosity (ML 1+8 at 125° C., ASTM D 1646) of from 34 to 44. Further, cure characteristics of SB Butyl 4266 are as follows: MH is 69±6 dN·m, ML is 11.5±4.5 dN·m (ASTM D2084).

The rubber compounds described herein can include halogenated butyl rubber. Halogenated butyl rubber is produced by the halogenation of the butyl rubber product described above. Halogenation can be carried out by any means. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. For example, the butyl rubber is halogenated in hexane diluent at from about 4° C. to about 60° C. using bromine ($Br_2$) or chlorine ($Cl_2$) as the halogenation agent. The halogenated butyl rubber has a Mooney viscosity (ML 1+8 at 125° C.) from about 20 to about 70 (or about 25 to about 55). The halogen wt % may be from about 0.1 wt % to 10 wt % (or about 0.5 wt % to about 5 wt %, or about 1 wt % to about 2.5 wt %) based on the weight of the halogenated butyl rubber.

Commercially available halogenated butyl rubbers include, but are not limited to, BROMOBUTYL 2222 and BROMOBUTYL 2255 (each available from ExxonMobil Chemical Company).

The rubber compounds described herein may also comprise at least one random copolymer comprising a C4 to C7 isomonoolefins, such as isobutylene and an alkylstyrene comonomer, such as para-methylstyrene, containing at least 80%, more alternatively at least 90% by weight of the para-isomer and optionally include functionalized interpolymers wherein at least one or more of the alkyl substituents groups present in the styrene monomer units contain benzylic halogen or some other functional group. For example, the polymer may be a random elastomeric copolymer of ethylene or a C3 to C6 α-olefin and an alkylstyrene comonomer, such as para-methylstyrene containing at least 80%, alternatively at least 90% by weight of the para-isomer and optionally include functionalized interpolymers wherein at least one or more of the alkyl substituents groups present in the styrene monomer units contain benzylic halogen or some other functional group. Exemplary materials may be characterized as polymers containing the following monomer units randomly spaced along the polymer chain:

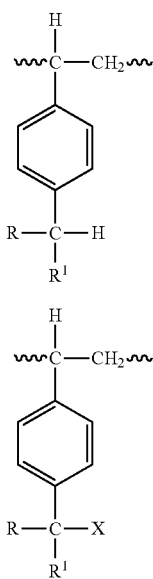

wherein R and R1 are independently hydrogen, lower alkyl, such as a C1 to C7 alkyl and primary or secondary alkyl halides and X is a functional group such as halogen. For example, R and R1 may each be hydrogen. Up to about 60 mol % (or about 0.1 mol % to about 5 mol %, or about 0.2 mol % to about 3 mol %) of the para-substituted styrene present in the random polymer structure may be the functionalized structure (2) above.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445. For example, the elastomer comprises random polymers of isobutylene and para-methylstyrene containing from 0.5 to 20 mol % para-methylstyrene wherein up to 60 mol % of the methyl substituent groups present on the benzyl ring contain a bromine or chlorine atom, such as a bromine atom (para-(bromomethylstyrene)), as well as acid or ester functionalized versions thereof. For example, the functionality is selected such that it can react or form polar bonds with functional groups present in the matrix polymer, for example, acid, amino or hydroxyl functional groups, when the polymer components are mixed at high temperatures.

The random copolymer may be prepared by a slurry polymerization, typically in a diluent comprising a halogenated hydrocarbon(s) such as a chlorinated hydrocarbon and/or a fluorinated hydrocarbon including mixtures thereof (e.g., WO 2004/058828, WO 2004/058827, WO 2004/058835, WO 2004/058836, WO 2004/058825, WO 2004/067577, and WO 2004/058829) of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

For example, brominated poly(isobutylene-co-p-methylstyrene) ("BIMSM") polymers generally contain from about 0.1 mol % to about 5 mol % of bromomethylstyrene groups relative to the total amount of monomer derived units in the copolymer. In another example, the amount of bromomethyl groups is from about 0.2 mol % to about 3.0 mol % (or about 0.3 mol % to about 2.8 mol %, or about 0.4 mol % to about 2.5 mol %, or about 0.3 mol % to about 2.0 mol %). The random polymer is a copolymer of C4 to C7 isoolefin derived units (or isomonoolefin), para-methylstyrene derived units and para-(halomethylstyrene) derived units, wherein the para-(halomethylstyrene) units are present in the polymer from about 0.4 mol % to about 3.0 mol % based on the total number of para-methylstyrene, and wherein the para-methylstyrene derived units are present from about 3 wt % to about 15 wt % (or about 4 wt % to about 10 wt %) based on the total weight of the polymer. The para-(halomethylstyrene) may be para-(bromomethylstyrene).

A commercially available example of the halogenated isobutylene-p-methylstyrene rubber is EXXPRO™ elastomers (available from ExxonMobil Chemical Company), having a Mooney viscosity (ML 1+8 at 125° C.) of from about 30 to about 50, a p-methylstyrene content of about 4 wt % to about 8.5 wt %, and a bromine content of about 0.7 wt % to about 2.2 wt % relative to the halogenated isobutylene-p-methylstyrene rubber.

The rubber compounds described herein may also use a specialty rubber containing a polar functional group such as butadiene-acrylonitrile rubber (NBR, or nitrile rubber), a copolymer of 2-propenenitrile and 1,3-butadiene. Nitrile rubber can have an acrylonitrile content of from about 10 wt % to about 50 wt % (or about 15 wt % to about 40 wt %, or about 18 wt % to about 35 wt %). The Mooney viscosity (1+4, 100° C.) may range from about 30 to about 90 (or about 30 to about 75). These rubbers are common in the art, and described in, for example, HANDBOOK OF PLASTICS, ELASTOMERS, AND COMPOSITES 1.41-1.49 (Harper, ed., McGraw-Hill, Inc. 1992). Commercial examples of these synthetic rubbers are sold under the trade names BREON™, NIPOL™, SIVIC™ and ZETPOL™ (available from Zeon Chemicals), EUROPRENE™ N (available from Polimeri Europa Americas), and KRYNAC™, PERBUNAN™ and THERBAN™ (available from Lanxess Corporation).

The rubber compounds described herein may also use a derivative of NBR such as hydrogenated or carboxylated or styrenated nitrile rubbers. Butadiene-acrylonitrile-styrene rubber, a copolymer of 2-propenenitrile, 1,3-butadiene and styrene, can have an acrylonitrile content of about 10 wt % to about 40 wt % (or about 15 wt % to about 30 wt %, or about 18 wt % to about 30 wt %). The styrene content of the SNBR copolymer may range from about 15 wt % to about 40 wt % (or about 18 wt % to about 30 wt %, or about 20 wt % to about 25 wt %). The Mooney viscosity (1+4, 100° C.) may range from about 30 to about 60 (or about 30 to about 55). These rubbers are common in the art, and described in, for example, HANDBOOK OF PLASTICS, ELASTOMERS, AND COMPOSITES 1.41-1.49 (Harper, ed., McGraw-Hill, Inc. 1992). A commercially available example of this synthetic rubber is sold under the trade name KRYNAC™ (Lanxess Corporation).

The rubber compounds described herein may also use a specialty rubber containing a halogen group such as polychloroprene ("CR" or "chloroprene rubber"), a homopolymer of 2-chloro-1,3-butadiene. The Mooney viscosity (1+4, 100° C.) may range from about 30 to about 110 (or about 35 to about 75). These rubbers are common in the art, and described in, for example, HANDBOOK OF PLASTICS, ELASTOMERS, AND COMPOSITES 1.41-1.49 (Harper, ed., McGraw-Hill, Inc. 1992). Commercial examples of these synthetic rubbers are sold under the trade names NEOPRENE™ (DuPont Dow Elastomers), BUTACLOR™ (Polimeri Europa Americas) and BAYPREN™ (Lanxess Corporation).

Rubber compounds of the present disclosure and tire parts produced therefrom may comprise EP(D)M polymers in addition to the PE(D)M polymers and additional rubber. EP(D)M polymers may have an ethylene content from 50 wt % to 95 wt % (or 50 wt % to 90 wt %, or 55 wt % to 85 wt %, or 60 wt % to 75 wt %), based on the weight of the EP(D)M polymer.

EP(D)M polymers of the present disclosure further comprise a $C_3$ to $C_{16}$ α-olefin content and, optionally, a polyene (preferably diene) content. EP(D)M polymers may have a $C_3$ to $C_{16}$ α-olefin content from 5 wt % to 60 wt % (or 10 wt % to 50 wt %, or 25 wt % to 50 wt %, or 5 wt % to 30 wt %), based on the weight of the EP(D)M polymer. $C_3$ to $C_{16}$ α-olefins include propylene, butylene, pentylene, hexylene, heptylene, octylene, nonylene, decylene, undecylene, dodecylene, and branched isomers thereof. Propylene and butylene (1-butene) are preferred in $C_3$ to $C_{16}$ α-olefins. The EP(D)M polymers can have isotactic polypropylene content.

EP(D)M polymers may have a polyene content (preferably a diene content) from 0 wt % to 10 wt % (or 0.5 wt % to 5 wt %, or 5 wt % to 10 wt %, or 3 wt % to 7 wt %), based on the weight of the EP(D)M polymer. Any polyene suitable in the PE(D)M polymers is suitable for inclusion in the EP(D)M polymers, with VNB or ENB, and in particular ENB, preferred.

According to yet other embodiments, suitable polyenes may include conjugated dienes. Conjugated dienes include 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Dienes also include vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The EP(D)M polymer exhibits more crystallinity than the PE(D)M; for instance, it may have Hf>1 J/g. The crystallinity of EP(D)M polymers of the present disclosure may be expressed in terms of percentage of crystallinity (i.e.,% crystallinity), as determined according to the DSC procedure described herein. An EP(D)M polymer may have a % crystallinity of from 5% to 80%, such as from 10% to 60%, such as from 20% to 40%. (The degree of crystallinity is determined by dividing heat of fusion measured with the heat of fusion for 100% crystalline polyethylene which has the value of 293 J/g (B. Wunderlich, Thermal Analysis, Academic Press, 1990, pp. 417-431).)

EP(D)M polymers may be an ethylene-propylene copolymer and in particular an EP(D)M terpolymer (e.g., VISTALON™ 706, available from ExxonMobil; TAFMER™, available from Mitsui Chemicals; or VERSIFY™, available from Dow Chemical) or an EB(D)M terpolymer. EP(D)M polymers of the present disclosure can have a weight average molecular weight (Mw) from 10,000 g/mol to 400,000 g/mol, or 100,000 g/mol to 200,000 g/mol. They may also or instead have a melting point (DSC) of less than 110° C., or less than 100° C.

Compositions described herein can comprise a single EP(D)M polymer or a mixture of two or more EP(D)M polymers, it being possible for the EP(D)M polymers to be used in combination with any type of synthetic elastomer other than an EP(D)M polymer, indeed even with polymers other than elastomers, for example thermoplastic polymers.

The EP(D)M polymers may be a polyethylene-polybutadiene block-copolymer, wherein the polyethylene-polybutadiene block-copolymer is a block copolymer having the general formula: PE-XL-fPB; where "PE" is a polyethylene block having a weight average molecular weight within the range from 1,000 to 150,000 g/mol, the "fPB" is a functionalized polar polybutadiene block having a weight average molecular weight from 500 g/mol to 30,000 g/mol, and "XL" is a crosslinking moiety that covalently links the PE and fPB blocks; and wherein the Maximum Energy Loss (Tangent Delta) of the immiscible polyolefin domain is a temperature within the range from −30° C. to 10° C.

Example Embodiments

A first nonlimiting example embodiment is a tire that comprises: a rubber compound that comprises: about 5 phr to about 50 phr of a propylene-α-olefin-(optional diene) PE(D)M polymer that comprises about 65 wt % to about 99.5 wt % propylene, about 0.5 wt % to about 35 wt % α-olefin that is not propylene, and 0 wt % to about 20 wt % diene, said wt % based on the weight of the PE(D)M polymer, and about 50 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly (isobutylene-co-alkylstyrene), a halogenated isobutylene-based rubber, polychloroprene rubber, nitrile rubber, and any combination thereof; and wherein the rubber and the PE(D)M polymer cumulatively are 100 phr. The first nonlimiting example embodiment may further include one or more of: Element 1: wherein the halogenated isobutylene-based rubber is selected from the group consisting of: bromobutyl rubber, chlorobutyl rubber, brominated polymers derived from a copolymer of isobutylene and p-methylstyrene elastomer, and any combination thereof; Element 2: wherein the rubber further comprises EP(D)M; Element 3: wherein the rubber compound is included in a sidewall of the tire, an inner tube of the tire, an innerliner of the tire, or any combination thereof; Element 4: wherein the rubber compound has a Mooney viscosity (ML, 1+4 @ 100° C.) of about 30 MU to about 100 MU; Element 5: wherein the rubber compound has a PICMA tack of about 0.9 kgf or greater; Element 6: wherein the rubber compound has a 180° peel strength after curing at 160° C. for 8 minutes of about 3 kgf/cm to about 25 kgf/cm; Element 7: wherein the rubber compound has a Shore A hardness after curing at 160° C. for 8 minutes of about 40 to about 70; Element 8: wherein the rubber compound has a Shore A hardness after curing at 160° C. for 8 minutes then aging at 125° C. for about 3 days of about 55 to about 80; Element 9: wherein the rubber compound has a modulus at 100% elongation after curing at 160° C. for 8 minutes of about 0.7 MPa to about 4 MPa; Element 10: wherein the rubber compound has a modulus at 100% elongation after curing at 160° C. for 8 minutes then aging at 125° C. for about 3 days of about 1 MPa to about 7 MPa; Element 11: wherein the rubber compound has a tensile strength after curing at 160° C. for 8 minutes of about 7 MPa to about 20 MPa; Element 12: wherein the rubber compound has a tensile strength after curing at 160° C. for 8 minutes then aging at 125° C. for about 3 days of about 5 MPa to about 15 MPa; Element 13: wherein the rubber compound has an elongation at break after curing at 160° C. for 8 minutes of about 250% to about 800%; Element 14: wherein the rubber compound has an elongation at break after curing at 160° C. for 8 minutes then aging at 125° C. for about 3 days of about 50% to about 600%; Element 15: wherein the rubber compound has an energy at break after curing at 160° C. for 8 minutes of about 3 J to about 10 J; Element 16: wherein the rubber compound has an energy at break after curing at 160° C. for 8 minutes then aging at 125° C. for about 3 days of about 10 J to about 20 J; Element 17: wherein the rubber compound has an abrasion loss after curing at 160° C. for 8 minutes of about 100 mm$^3$ to about 200 mm$^3$; Element 18: wherein the rubber compound has a permeance coefficient after curing at 160° C. for 8 minutes of about 1 cc/(m$^2$*day·mm·Hg) to about 4 cc/(m$^2$*day·mm·Hg); Element 19: wherein the rubber compound has a tear resistance after curing at 160° C. for 8 minutes of about 25 N/mm to about 50 N/mm; Element 20: wherein the rubber compound has a tear resistance after curing at 160° C. for 8 minutes then aging at 125° C. for about 3 days of about 20 N/mm to about 55 N/mm; Element 21: wherein the rubber compound has an ozone resistance where a sample of the rubber compound exhibits no cracking after exposure to 50 pphm ozone at 40° C. for about 4 hours to about 200 hours; Element 22: wherein the rubber compound has an ozone resistance where a sample of the rubber compound does not break after exposure to 50 pphm ozone at 40° C. for about 4 hours to about 200 hours; Element 23: wherein the PE(D)M polymer has a heat of fusion (Hf) of less than 1 J/g; Element 24: wherein the PE(D)M polymer has (a) Mooney viscosity (ML(1+4) @ 125° C.) of about 5 MU to about 100 MU, and (b) a melt flow rate of about 0.1 g/min to about 100 g/min; Element 25: wherein the PE(D)M polymer has a number average molecular weight of 40,000 g/mol to 200,000 g/mol; Element 26: wherein the PE(D)M polymer has a weight average molecular weight of 100,000 g/mol to 500,000 g/mol; Element 27: wherein the PE(D)M polymer has a polydispersity index of 2.0 to 3.0; Element 28: wherein the PE(D)M polymer has a glass transition temperature (° C.) of greater than or equal to $-7.386-(87.98*E)+(294*D)$ and less than or equal to $-1.386-(87.98*E)+(294*D)$ wherein E is a mole fraction of ethylene in the PE(D)M polymer and D is a mole fraction of diene in the PE(D)M polymer; Element 29: wherein the PE(D)M polymer has a glass transition temperature (° C.) of greater than or equal to $-6.886-(87.98*E)+(294*D)$ and less than or equal to $-1.886-(87.98*E)+(294*D)$ wherein E is the mole fraction of ethylene in the PE(D)M polymer and D is the mole fraction of diene in the PE(D)M polymer; and Element 30: wherein the rubber compound is at least partially crosslinked. Examples of combinations include, but are not limited to, two or more of Elements 1-3 in combination; two or more of Elements 4-22 in combination; two or more of Elements 23-29 in combination; one or more of Elements 1-3 in combination with one or more of Elements 4-22; one or more of Elements 1-3 in combination with one or more of Elements 23-29 and optionally in further combination with one or more of Elements 4-22; one or more of Elements 23-29 in combination with one or more of Elements 4-22; and Element 30 in combination with one or more of Elements 1-29.

A second nonlimiting example embodiment is a method comprising: producing a master batch at a first temperature, the master batch comprising: about 5 phr to about 50 phr of a propylene-α-olefin-(optional diene) PE(D)M polymer that comprises about 65 wt % to about 99.5 wt % propylene, about 0.5 wt % to about 35 wt % α-olefin that is not propylene, and 0 wt % to about 20 wt % diene, said wt % based on the weight of the PE(D)M polymer, and about 50 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof; wherein the rubber and the PE(D)M polymer cumulatively are 100 phr; and mixing a curative and/or a crosslinking agent into the master batch at a second temperature that is lower than the first temperature. The second nonlimiting example embodiment may further include one or more of Elements 1-30, including in the foregoing combinations.

A third nonlimiting example embodiment is a tire that comprises: a sidewall that comprises a rubber compound that comprises: about 5 phr to about 50 phr of a propylene-α-olefin-(optional diene) PE(D)M polymer that comprises about 65 wt % to about 99.5 wt % propylene, about 0.5 wt % to about 35 wt % α-olefin that is not propylene, and 0 wt % to about 20 wt % diene, said wt % based on the weight of the PE(D)M polymer, and about 50 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof (preferably natural rubber, polybutadiene rubber, and any combination thereof); and wherein the rubber and the PE(D)M polymer cumulatively are 100 phr. The PE(D)M polymer may be characterized by one or more of Elements 23-29, and the rubber compound may be characterized by one or more of Elements 4-22. The preferred properties of the rubber compound may be one or more of the preferred ranges for said properties described herein relative to tire sidewalls.

A fourth nonlimiting example embodiment is a tire that comprises: an inner tube that comprises a rubber compound that comprises: about 5 phr to about 30 phr of a propylene-α-olefin-(optional diene) PE(D)M polymer that comprises about 65 wt % to about 99.5 wt % propylene, about 0.5 wt % to about 35 wt % α-olefin that is not propylene, and 0 wt % to about 20 wt % diene, said wt % based on the weight of the PE(D)M polymer, and about 70 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof (preferably IIR, BIIR, CIIR, and any combination thereof); and wherein the rubber and the PE(D)M polymer cumulatively are 100 phr. The PE(D)M polymer may be characterized by one or more of Elements 23-29, and the rubber compound may be characterized by one or more of Elements 4-22. The preferred properties of the rubber compound may be one or more of the preferred ranges for said properties described herein relative to tire inner tubes.

A fifth nonlimiting example embodiment is a tire that comprises: an innerliner that comprises a rubber compound that comprises: about 5 phr to about 20 phr of a propylene-α-olefin-(optional diene) PE(D)M polymer that comprises about 65 wt % to about 99.5 wt % propylene, about 0.5 wt % to about 35 wt % α-olefin that is not propylene, and 0 wt % to about 20 wt % diene, said wt % based on the weight of the PE(D)M polymer, and about 80 parts per hundred parts rubber (phr) to about 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof (preferably natural rubber, BIIR, CIIR, and any combination thereof); and wherein the rubber and the PE(D)M polymer cumulatively are 100 phr. The PE(D)M polymer may be characterized by one or more of Elements 23-29, and the rubber compound may be characterized by one or more of Elements 4-22. The preferred properties of the rubber compound may be one or more of the preferred ranges for said properties described herein relative to tire innerliners.

To facilitate a better understanding of the embodiments of the present invention, the following examples of preferred or representative embodiments are given. In no way should the following examples be read to limit, or to define, the scope of the invention.

EXAMPLES

Three sets of experiments were conducted with respect to examples of the PE(D)M compounds disclosed herein. The descriptions of the experimental formulations and the data obtained is reported below. As to each of these, standard techniques were used.

Example Set 1—The objective of the first example set is to describe compounds of PE(D)M with NR and PBR for tire sidewall applications. Table 1.1 below lists the polymer characteristics of several PE(D)M polymers used in making a plurality of the experimental formulations set forth in Tables 1.2A and 1.2B. All the PE(D)M samples (PE(D)M-1.1-PE(D)M-1.13) showed a Hf of 0 J/g (undetectable) by DSC. PE(D)M-1.6 showed a Hf of 0 J/g (undetectable) after the DSC experiment and subsequently aging at room temperature for 4 weeks as measured from the first heating cycle.

TABLE 1.1

| | PE(D)M Polymers | | | | | | | | | |
|---|---|---|---|---|---|---|---|---|---|---|
| Sample | C2 by FTIR (wt %) | ENB by FTIR (wt %) | ML (1 + 4) at 125° C. (MU) | $T_g$ (° C.) | mm | mr | rr | M | r | m/r |
| PE(D)M-1.1 | 5.7 | 0 | 14 | −9.7 | 0.19 | 0.32 | 0.50 | 0.35 | 0.65 | 0.53 |
| PE(D)M-1.2 | 20.7 | 0.4 | 11 | −30.0 | | | | | | |
| PE(D)M-1.3 | 5.1 | 2.5 | 38 | −5.9 | 0.12 | 0.26 | 0.62 | 0.25 | 0.75 | 0.34 |
| PE(D)M-1.4 | 9.7 | 2.7 | 17 | −13.6 | 0.20 | 0.20 | 0.60 | 0.30 | 0.70 | 0.43 |
| PE(D)M-1.5 | 18.0 | 2.7 | 13 | −23.0 | | | | | | |
| PE(D)M-1.6 | 4.6 | 2.8 | 15 | −6.2 | 0.18 | 0.30 | 0.52 | 0.33 | 0.67 | 0.50 |
| PE(D)M-1.7 | 15.3 | 2.8 | 15 | −18.1 | | | | | | |
| PE(D)M-1.8 | 5.3 | 3.0 | 54 | −6.5 | | | | | | |
| PE(D)M-1.9 | 18.1 | 4.5 | 14 | −20.8 | | | | | | |
| PE(D)M-1.10 | 5.2 | 5.4 | 16 | −3.0 | | | | | | |
| PE(D)M-1.11 | 16.3 | 9.6 | 17 | −14.2 | | | | | | |
| PE(D)M-1.12 | 17.9 | 14.8 | 20 | −8.3 | | | | | | |
| PE(D)M-1.13 | 17.1 | 18.6 | 19 | −4.5 | | | | | | |

| | PE(D)M Polymers (continued) | | | |
|---|---|---|---|---|
| Sample | $M_n$ (LS) (g/mol) | $M_w$ (LS) (g/mol) | Mz (LS) (g/mol) | $M_w$(LS)/$M_n$(LS) |
| PE(D)M-1.1 | 72,000 | 164,000 | 269,000 | 2.28 |
| PE(D)M-1.2 | 56,000 | 137,000 | 229,000 | 2.44 |
| PE(D)M-1.3 | 102,000 | 258,000 | 548,000 | 2.53 |
| PE(D)M-1.4 | 78,000 | 164,000 | 263810 | 2.10 |
| PE(D)M-1.5 | 64,000 | 147,000 | 249,000 | 2.30 |

TABLE 1.1-continued

| | | | | |
|---|---|---|---|---|
| PE(D)M-1.6 | 83,000 | 168,000 | 265,000 | 2.03 |
| PE(D)M-1.7 | 73,000 | 154,000 | 246,000 | 2.10 |
| PE(D)M-1.8 | 146,000 | 313,000 | 510,000 | 2.15 |
| PE(D)M-1.9 | 67,000 | 152,000 | 261,000 | 2.26 |
| PE(D)M-1.10 | 79,000 | 171,000 | 285,000 | 2.16 |
| PE(D)M-1.11 | 72,000 | 163,000 | 289,000 | 2.27 |
| PE(D)M-1.12 | 72,000 | 184,000 | 386,000 | 2.55 |
| PE(D)M-1.13 | 77,000 | 197,000 | 445,000 | 2.56 |

Tables 1.2A and 1.2B contain the components of the 15 experimental formulations (units are phr), which were mixed according to the procedure described in Table 1.2C. The PE(D)M samples from Table 1.1 were blended into typical tire sidewall applications to form experimental formulations by replacing equally natural rubber (NR) and polybutadiene rubber (PBR) as noted. Chemicals such as tackifiers, antioxidants, antiozonents, and waxes were replaced in the experimental formulations with naphthenic oil as shown in Tables 1.2A and 1.2B to keep the polymer percentage in the experimental formulations at a similar level to that of a typical tire sidewall composition without PE(D)M. Experimental formulation 1 is the "Target Formulation" in Example Set 1, and experimental formulation 2 is the "Control Formulation" in Example Set 1. Experimental formulations 3 through 15 (for a total of 13) are compared against the target and control formulations in Example Set 1.

The experimental formulations in Tables 1.2A and 1.2B (values are phr unless otherwise specified) were mixed in a two-stage process on a 1.57 liter capacity laboratory BANBURY™ lab scale mixer as the following mixing sequence in Table 1.2C. Carbon black, oil, and other compounding ingredients were added and the 1st pass or non-productive compound dropped at ~160° C. The final or productive compound containing the vulcanization system was prepared by a similar process, but using a drop or dump temperature of ~100° C. Mixing sequence and discharge/dump temperature conditions kept similar for butyl and EXXPRO™ based tire curing bladder application. All molding was done at approximately 160° C. for 8 minutes.

TABLE 1.2A

Tire Sidewall Experimental Formulations

| | Experimental Formulation Number | | | | | | |
|---|---|---|---|---|---|---|---|
| Ingredient | 1 Target | 2 Control | 3 | 4 | 5 | 6 | 7 |
| Natural Rubber | 50 | 50 | 37.5 | 37.5 | 37.5 | 37.5 | 37.5 |
| Butadiene Rubber | 50 | 50 | 37.5 | 37.5 | 37.5 | 37.5 | 37.5 |
| Material (for PE(D)M's [C2 %, ENB %, ML]) | | | | | | | |
| PE(D)M-1.6 [5.7, 0, 14] | | | 25 | | | | |
| PE(D)M-1.8 [20.7, 0.4, 11] | | | | 25 | | | |
| PE(D)M-1.4 [5.1, 2.5, 38] | | | | | 25 | | |
| PE(D)M-1.2 [9.7, 2.7, 17] | | | | | | 25 | |
| PE(D)M-1.9 [18, 2.7, 13] | | | | | | | 25 |
| PE(D)M-1.1 [4.6, 2.8, 15] | | | | | | | |
| PE(D)M-1.3 [15.3, 2.8, 15] | | | | | | | |
| PE(D)M-1.5 [5.3, 3, 54] | | | | | | | |
| PE(D)M-1.11 [16.3, 9.6, 17] | | | | | | | |
| PE(D)M-1.12 [17.9, 14.8, 20] | | | | | | | |
| PE(D)M-1.7 [5.2, 5.4, 16] | | | | | | | |
| PE(D)M-1.10 [18.1, 4.5, 14] | | | | | | | |
| PE(D)M-1.13 [17.1, 18.6, 19] | | | | | | | |
| N330 | 50 | 50 | 50 | 50 | 50 | 50 | 50 |
| naphthenic oil | 5 | 15.5 | 15.5 | 15.5 | 15.5 | 15.5 | 15.5 |
| paraffinic wax | 0.7 | | | | | | |
| microcrystalline wax | 1.3 | | | | | | |
| SANTOFLEX ™ 6PPD | 4 | | | | | | |
| TMQ | 2 | | | | | | |
| SP 1068 (thermoplastic resin, available from Akrochem) | 2.5 | | | | | | |
| zinc oxide | 3 | 3 | 3 | 3 | 3 | 3 | 3 |
| stearic acid | 1 | 1 | 1 | 1 | 1 | 1 | 1 |
| Master Batch Total (phr) | 169.5 | 169.5 | 169.5 | 169.5 | 169.5 | 169.5 | 169.5 |
| TBBS | 1.5 | 1.5 | 1.5 | 1.5 | 1.5 | 1.5 | 1.5 |
| DPG | 0.5 | 0.5 | 0.5 | 0.5 | 0.5 | 0.5 | 0.5 |
| insoluble sulfur | 2.5 | 2.5 | 2.5 | 2.5 | 2.5 | 2.5 | 2.5 |
| Total (phr) | 174 | 174 | 174 | 174 | 174 | 174 | 174 |

TABLE 1.2B

Tire Sidewall Experimental Formulations

| Ingredient | 8 | 9 | 10 | 11 | 12 | 13 | 14 | 15 |
|---|---|---|---|---|---|---|---|---|
| Natural Rubber | 37.5 | 37.5 | 37.5 | 37.5 | 37.5 | 37.5 | 37.5 | 37.5 |
| Butadiene Rubber | 37.5 | 37.5 | 37.5 | 37.5 | 37.5 | 37.5 | 37.5 | 37.5 |
| Material (for PE(D)M's [C2 %, ENB %, ML]) | | | | | | | | |
| PE(D)M-1.6 [5.7, 0, 14] | | | | | | | | |
| PE(D)M-1.8 [20.7, 0.4, 11] | | | | | | | | |
| PE(D)M-1.4 [5.1, 2.5, 38] | | | | | | | | |
| PE(D)M-1.2 [9.7, 2.7, 17] | | | | | | | | |
| PE(D)M-1.9 [18, 2.7, 13] | | | | | | | | |
| PE(D)M-1.1 [4.6, 2.8, 15] | 25 | | | | | | | |
| PE(D)M-1.3 [15.3, 2.8, 15] | | 25 | | | | | | |
| PE(D)M-1.5 [5.3, 3, 54] | | | 25 | | | | | |
| PE(D)M-1.11 [16.3, 9.6, 17] | | | | 25 | | | | |
| PE(D)M-1.12 [17.9, 14.8, 20] | | | | | 25 | | | |
| PE(D)M-1.7 [5.2, 5.4, 16] | | | | | | 25 | | |
| PE(D)M-1.10 [18.1, 4.5, 14] | | | | | | | 25 | |
| PE(D)M-1.13 [17.1, 18.6, 19] | | | | | | | | 25 |
| N330 | 50 | 50 | 50 | 50 | 50 | 50 | 50 | 50 |
| naphthenic oil | 15.5 | 15.5 | 15.5 | 15.5 | 15.5 | 15.5 | 15.5 | 15.5 |
| paraffinic wax | | | | | | | | |
| microcrystalline wax | | | | | | | | |
| SANTOFLEX ™ 6PPD | | | | | | | | |
| TMQ | | | | | | | | |
| SP 1068 | | | | | | | | |
| zinc oxide | 3 | 3 | 3 | 3 | 3 | 3 | 3 | 3 |
| stearic acid | 1 | 1 | 1 | 1 | 1 | 1 | 1 | 1 |
| Master Batch Total (phr) | 169.5 | 169.5 | 169.5 | 169.5 | 169.5 | 169.5 | 169.5 | 169.5 |
| TBBS | 1.5 | 1.5 | 1.5 | 1.5 | 1.5 | 1.5 | 1.5 | 1.5 |
| DPG | 0.5 | 0.5 | 0.5 | 0.5 | 0.5 | 0.5 | 0.5 | 0.5 |
| insoluble sulfur | 2.5 | 2.5 | 2.5 | 2.5 | 2.5 | 2.5 | 2.5 | 2.5 |
| Total (phr) | 174 | 174 | 174 | 174 | 174 | 174 | 174 | 174 |

TABLE 1.2C

Mixing Sequence for Experimental Formulations of Tables 1.2A and 1.2B

| Sequence of Master Batch Mixing | | Sequence Final Batch Mixing | |
|---|---|---|---|
| Time in Minutes | Addition Sequence | Time in Minutes | Addition Sequence |
| 0' | Add Polymer (NR/PBR/PE(D)M) | 0' | ½ MB + curative + ½ MB |
| 1' | Carbon Black + Oil + Chemicals | 1' | Sweep |
| 2' | Sweep | 2' | Dumped at 95-105° C. |
| 3' | Sweep | | |
| 5.5' | Dumped at 155° C.-160° C. | | |

As shown in Tables 1.3A and 1.3B below, as to Mooney viscosity, except for Formulation 10, all of the PE(D)M-based formulations appear to provide lower Mooney viscosity as compared to Experimental Formulation 1 (Target) and Experimental Formulation 2 (Control). As to Mooney Scorch, all of the PE(D)M-based formulations appear to provide scorch safety (t5) higher than Experimental Formulation 1 (Target) and Experimental Formulation 2 (Control). As to MDR Rheometer properties, all of the PE(D)M-based formulations appear to provide lower delta torque (MH-ML) than Experimental Formulation 1 (Target) and Experimental Formulation 2 (Control). As to Scorch Safety, all PE(D)M-based formulations provide higher Scorch Safety (ts2/t10) than Experimental Formulation 1 (Target) and comparable to Experimental Formulation 2 (Control).

TABLE 1.3A

Mooney Viscosity, Mooney Scorch, and Rheometer Properties

| | | Experimental Formulations | | | | | |
|---|---|---|---|---|---|---|---|
| Parameter | Units | 1 Target | 2 Control | 3 | 4 | 5 | 6 | 7 |
| ML(1 + 4) at 100° C. | MU | 48 | 43 | 36 | 35 | 44 | 37 | 36 |
| Mm | MU | 39 | 35 | 27 | 26 | 33 | 28 | 27 |
| t5 | min | 8.6 | 11.7 | 11.5 | 11.6 | 11.5 | 11.6 | 11.6 |
| t35 | min | 10.1 | 14.2 | 13.8 | 13.9 | 13.9 | 13.9 | 13.9 |
| ML at 160° C. | dNm | 1.9 | 1.8 | 1.5 | 1.5 | 1.7 | 1.5 | 1.5 |
| MH at 160° C. | dNm | 18.4 | 19.2 | 16.8 | 16.8 | 16.3 | 17.0 | 16.9 |
| MH-ML at 160° C. | dNm | 16.5 | 17.5 | 15.4 | 15.3 | 14.6 | 15.5 | 15.4 |
| ts2 at 160° C. | min | 1.0 | 1.3 | 1.2 | 1.2 | 1.3 | 1.2 | 1.2 |
| t10 at 160° C. | min | 1.0 | 1.2 | 1.2 | 1.1 | 1.2 | 1.2 | 1.2 |
| t50 at 160° C. | min | 1.3 | 1.6 | 1.6 | 1.6 | 1.6 | 1.6 | 1.6 |
| t90 at 160° C. | min | 1.9 | 2.3 | 2.3 | 2.3 | 2.3 | 2.3 | 2.3 |
| ML at 180° C. | dNm | 1.7 | 1.6 | 1.4 | 1.3 | 1.5 | 1.4 | 1.3 |
| MH at 180° C. | dNm | 17.1 | 17.7 | 15.3 | 15.4 | 14.8 | 15.3 | 15.3 |

TABLE 1.3A-continued

Mooney Viscosity, Mooney Scorch, and Rheometer Properties

| Parameter | Units | Experimental Formulations | | | | | | |
|---|---|---|---|---|---|---|---|---|
| | | 1 Target | 2 Control | 3 | 4 | 5 | 6 | 7 |
| MH-ML at 180° C. | dNm | 15.4 | 16.1 | 13.9 | 14.0 | 13.3 | 13.9 | 14.0 |
| ts2 at 180° C. | min | 0.5 | 0.5 | 0.5 | 0.5 | 0.5 | 0.5 | 0.5 |
| t10 at 180° C. | min | 0.4 | 0.5 | 0.5 | 0.5 | 0.5 | 0.5 | 0.5 |
| t50 at 180° C. | min | 0.6 | 0.7 | 0.7 | 0.7 | 0.7 | 0.7 | 0.7 |
| t90 at 180° C. | min | 0.8 | 0.9 | 0.9 | 0.9 | 0.9 | 0.9 | 0.9 |

TABLE 1.3B

Mooney Viscosity, Mooney Scorch, and Rheometer Properties

| Parameter | Unit | Experimental Formulations | | | | | | | |
|---|---|---|---|---|---|---|---|---|---|
| | | 8 | 9 | 10 | 11 | 12 | 13 | 14 | 15 |
| ML(1 + 4) at 100° C. | MU | 37 | 37 | 47 | 36 | 37 | 38 | 38 | 38 |
| Mm | MU | 27 | 27 | 35 | 27 | 27 | 28 | 28 | 28 |
| t5 | min | 11.6 | 11.8 | 11.7 | 11.6 | 11.7 | 11.9 | 11.7 | 11.7 |
| t35 | min | 13.9 | 14.1 | 14.2 | 13.8 | 13.9 | 14.2 | 13.9 | 13.9 |
| ML at 160° C. | dNm | 1.5 | 1.5 | 1.8 | 1.5 | 1.5 | 1.5 | 1.5 | 1.5 |
| MH at 160° C. | dNm | 17.1 | 16.6 | 16.8 | 17.0 | 17.1 | 17.5 | 17.8 | 17.8 |
| MH-ML at 160° C. | dNm | 15.6 | 15.2 | 15.0 | 15.5 | 15.6 | 16.0 | 16.3 | 16.3 |
| ts2 at 160° C. | min | 1.2 | 1.2 | 1.3 | 1.2 | 1.2 | 1.2 | 1.2 | 1.2 |
| t10 at 160° C. | min | 1.2 | 1.2 | 1.2 | 1.2 | 1.2 | 1.2 | 1.2 | 1.2 |
| t50 at 160° C. | min | 1.6 | 1.6 | 1.6 | 1.6 | 1.6 | 1.6 | 1.6 | 1.6 |
| t90 at 160° C. | min | 2.3 | 2.3 | 2.4 | 2.3 | 2.3 | 2.3 | 2.4 | 2.4 |
| ML at 180° C. | dNm | 1.4 | 1.4 | 1.6 | 1.4 | 1.4 | 1.4 | 1.4 | 1.4 |
| MH at 180° C. | dNm | 15.5 | 15.2 | 15.1 | 15.4 | 15.6 | 16.1 | 16.1 | 16.2 |
| MH-ML at 180° C. | dNm | 14.1 | 13.8 | 13.5 | 14.0 | 14.2 | 14.7 | 14.7 | 14.8 |
| ts2 at 180° C. | min | 0.5 | 0.5 | 0.5 | 0.5 | 0.5 | 0.5 | 0.5 | 0.5 |
| t10 at 180° C. | min | 0.5 | 0.5 | 0.5 | 0.5 | 0.5 | 0.5 | 0.5 | 0.5 |
| t50 at 180° C. | min | 0.7 | 0.7 | 0.7 | 0.7 | 0.7 | 0.7 | 0.7 | 0.7 |
| t90 at 180° C. | min | 0.9 | 0.9 | 0.9 | 0.9 | 0.9 | 0.9 | 0.9 | 0.9 |

Shown in Tables 1.4A and 1.4B are the PICMA tack properties of the experimental formulations. The PICMA tack tests were conducted on green (uncured) samples of the experimental formulations. Tack is defined as the force required to separate two sheet materials which are compressed together for a specified time. There are three primary factors which influence the behavior of tack: contact pressure, temperature and contact time.

This data shows that PICMA tack values of formulation 1 (target) is 1.22 and the experimental formulation (control) is 1.35. The PE(D)M formulations shown in experimental formulations 3 through 15 show increased PICMA tack. Tack parameter is measured by using 90° Tack Adhesion tester. Tack is measured as force required to separate the innerliner layer against carcass layer.

TABLE 1.4A

PICMA Tack Properties

| Parameter | Units | Formulation Number | | | | | | |
|---|---|---|---|---|---|---|---|---|
| | | 1 Target | 2 Control | 3 | 4 | 5 | 6 | 7 |
| PICMA tack | kgf | 1.22 | 1.35 | 1.49 | 1.48 | 1.39 | >1.52 | >1.52 |

TABLE 1.4B

Tack Properties for Experimental Formulations

| Parameter | Units | Formulation Number | | | | | | | |
|---|---|---|---|---|---|---|---|---|---|
| | | 8 | 9 | 10 | 11 | 12 | 13 | 14 | 15 |
| PICMA tack | kgf | >1.52 | >1.52 | >1.52 | >1.52 | >1.52 | >1.52 | >1.52 | >1.52 |

For the data in Tables 1.5A and 1.5B below, unless stated otherwise, the test samples were vulcanized at 160° C. at 8 minutes before testing.

Our observations indicate that all of the PE(D)M-based formulation provide Modulus higher than the target and control formulations. Additionally, PE(D)M-based experimental formulations 5, 12, 13, 14, and 15 provide better aged properties in comparison to experimental formulation 2 (control).

TABLE 1.5A

Hardness, Tensile, and Tear Properties (Original and Aged)

| Parameter | Units | Formulation Numbers | | | | | | |
|---|---|---|---|---|---|---|---|---|
| | | 1 Target | 2 Control | 3 | 4 | 5 | 6 | 7 |
| Original Hardness, Tensile, and Tear Properties | | | | | | | | |
| Hardness | Shore A | 63 | 62 | 63 | 62 | 63 | 64 | 62 |
| Modulus at 100% | MPa | 2.5 | 2.7 | 3.1 | 3.1 | 3.1 | 3.0 | 3.0 |
| Modulus at 200% | MPa | 5.8 | 6.5 | 7.0 | 7.2 | 7.3 | 7.0 | 6.8 |
| Modulus at 300% | MPa | 10.2 | 11.5 | 10.9 | 11.3 | 11.2 | 10.9 | 10.7 |
| Tensile strength | MPa | 18.0 | 17.8 | 11.5 | 12.1 | 11.9 | 11.0 | 11.4 |
| Elongation at break | % | 440 | 420 | 310 | 320 | 300 | 300 | 320 |
| Energy at break | J | 11.4 | 10.8 | 5.6 | 6.1 | 5.6 | 5.1 | 5.7 |
| Die C tear | N/mm | 37.8 | 37.3 | 26.1 | 22.6 | 24.7 | 23.2 | 23.0 |
| Aged Hardness, Tensile and Tear Properties (Hot Air Ageing for 3 days at 105° C.) | | | | | | | | |
| Hardness | Shore A | 72 | 66 | 70 | 68 | 70 | 69 | 70 |
| Modulus at 100% | MPa | 4.7 | 3.8 | 5.1 | 5.0 | 5.0 | 5.1 | 5.1 |
| Modulus at 200% | MPa | 10.8 | — | — | — | — | — | — |
| Modulus at 300% | MPa | — | — | — | — | — | — | — |
| Tensile strength | MPa | 12.3 | 8.2 | 6.8 | 6.4 | 8.2 | 7.4 | 6.8 |

TABLE 1.5A-continued

Hardness, Tensile, and Tear Properties (Original and Aged)

| Parameter | Units | 1 Target | 2 Control | 3 | 4 | 5 | 6 | 7 |
|---|---|---|---|---|---|---|---|---|
| Elongation at break | % | 220 | 180 | 130 | 130 | 150 | 140 | 130 |
| Energy at break | J | 4.3 | 2.1 | 1.3 | 1.2 | 1.8 | 1.5 | 1.3 |
| Die C tear | N/mm | 29.0 | 18.1 | 12.9 | 12.3 | 16.0 | 13.7 | 12.6 |

TABLE 1.5B

Hardness, Tensile and Tear Properties (Original and Aged)
Formulation Numbers

| Parameter | Units | 8 | 9 | 10 | 11 | 12 | 13 | 14 | 15 |
|---|---|---|---|---|---|---|---|---|---|
| Original Hardness, Tensile, and Tear Properties | | | | | | | | | |
| Hardness | Shore A | 64 | 63 | 64 | 64 | 64 | 64 | 64 | 64 |
| Modulus at 100% | MPa | 3.1 | 3.0 | 3.1 | 3.1 | 3.1 | 3.0 | 3.2 | 3.1 |
| Modulus at 200% | MPa | 7.2 | 6.8 | 7.1 | 7.1 | 7.1 | 7.0 | 7.4 | 7.2 |
| Modulus at 300% | MPa | 11.1 | 10.6 | 11.4 | 11.2 | 11.2 | 10.9 | 11.8 | 11.7 |
| Tensile strength | MPa | 11.7 | 11.6 | 12.1 | 11.4 | 11.8 | 11.6 | 12.3 | 13.7 |
| Elongation at break | % | 310 | 320 | 320 | 310 | 311 | 310 | 310 | 350 |

TABLE 1.5B-continued

Hardness, Tensile and Tear Properties (Original and Aged)
Formulation Numbers

| Parameter | Units | 8 | 9 | 10 | 11 | 12 | 13 | 14 | 15 |
|---|---|---|---|---|---|---|---|---|---|
| Energy at break | J | 5.7 | 5.8 | 6.0 | 5.4 | 5.8 | 5.6 | 6.0 | 7.3 |
| Die C tear | N/mm | 23.9 | 21.6 | 25.1 | 24.4 | 23.1 | 23.4 | 26.0 | 27.2 |
| Aged Hardness, Tensile and Tear Properties (Hot Air Ageing for 3 days at 105° C.) | | | | | | | | | |
| Hardness | Shore A | 70 | 71 | 71 | 72 | 71 | 70 | 71 | 70 |
| Modulus at 100% | MPa | 5.1 | 5.2 | 5.1 | 5.2 | 5.0 | 4.9 | 4.9 | 4.8 |
| Modulus at 200% | MPa | — | — | — | — | — | — | — | — |
| Modulus at 300% | MPa | — | — | — | — | — | — | — | — |
| Tensile strength | MPa | 7.7 | 7.1 | 7.7 | 6.4 | 8.0 | 8.1 | 8.6 | 8.7 |
| Elongation at break | % | 140 | 130 | 150 | 120 | 150 | 150 | 160 | 160 |
| Energy at break | J | 1.5 | 1.4 | 1.6 | 1.1 | 1.6 | 1.8 | 2.0 | 2.0 |
| Die C tear | N/mm | 13.0 | 12.4 | 15.7 | 12.7 | 14.4 | 14.5 | 15.4 | 16.4 |

As reflected in Tables 1.6A and 1.6B below, the maximum, minimum, and arithmetic mean of the fatigue to failure for the experimental formulations are reported for each set of test samples or compound.

As shown by the data, experimental formulation 5 appears to have higher fatigue life (Minimum Fatigue life parameter) in comparison to formulation 2 (Control) even though it has shown higher modulus.

TABLE 1.6A

Fatigue Properties
Formulation Numbers

| Parameter | Units | 1 Target | 2 Control | 3 | 4 | 5 | 6 | 7 |
|---|---|---|---|---|---|---|---|---|
| Original | | CAM 24, 136%, Test Temperature: 23 ± 2° C. | | | | | | |
| Specimen-1 | Cycles | 19310 | 10446 | 2007 | 1975 | 4850 | 3430 | 2374 |
| Specimen-2 | Cycles | 9750 | 4256 | 792 | 1645 | 6877 | 2255 | 3598 |
| Specimen-3 | Cycles | 15992 | 4725 | 2501 | 1809 | 3700 | 2185 | 3525 |
| Specimen-4 | Cycles | 7717 | 5280 | 1195 | 2659 | 5143 | 2480 | 2077 |
| Specimen-5 | Cycles | 3667 | 2644 | 2535 | 3653 | 6689 | 2110 | 2673 |
| Specimen-6 | Cycles | 30774 | 3608 | 2474 | 2139 | 4301 | 2768 | 4236 |
| Specimen-7 | Cycles | 4724 | 1388 | 3028 | 2777 | 6863 | 2498 | 3464 |
| Specimen-8 | Cycles | 14322 | 9164 | 2527 | 2088 | 5693 | 3218 | 2213 |
| Avg. KC's | K-Cycles | 13.3 | 5.2 | 2.1 | 2.4 | 5.3 | 2.6 | 3.0 |
| Std. Dev. | K-Cycles | 8.9 | 3.1 | 0.8 | 0.7 | 1.2 | 0.5 | 0.8 |
| Max. | K-Cycles | 30.8 | 10.4 | 3.0 | 3.7 | 6.9 | 3.4 | 4.2 |
| Min. | K-Cycles | 3.7 | 1.4 | 0.8 | 1.6 | 3.7 | 2.1 | 2.1 |

Data TABLE 1.6B

Fatigue Properties
Formulation Numbers

| Parameter | Units | 8 | 9 | 10 | 11 | 12 | 13 | 14 | 15 |
|---|---|---|---|---|---|---|---|---|---|
| Original | | | CAM 24, 136%, Test Temperature: 23 ± 2° C. | | | | | | |
| Specimen-1 | Cycles | 2217 | 1873 | 4033 | 2699 | 2761 | 5957 | 3506 | 6097 |
| Specimen-2 | Cycles | 2681 | 2096 | 2883 | 1220 | 4005 | 1922 | 5516 | 2546 |
| Specimen-3 | Cycles | 3341 | 2502 | 389 | 2640 | 2688 | 3673 | 3781 | 1572 |
| Specimen-4 | Cycles | 1493 | 2987 | 1966 | 983 | 2945 | 5066 | 3039 | 2820 |
| Specimen-5 | Cycles | 2978 | 2073 | 2839 | 2174 | 1136 | 3680 | 1872 | 6073 |
| Specimen-6 | Cycles | 3645 | 2458 | 2986 | 2479 | 2623 | 1020 | 5878 | 2916 |
| Specimen-7 | Cycles | 3543 | 1636 | 1529 | 4383 | 3838 | 5063 | 4240 | 5676 |
| Specimen-8 | Cycles | 856 | 2471 | 4731 | 2504 | 2164 | 1458 | 3854 | 7623 |
| Avg. KC's | K-Cycles | 2.6 | 2.3 | 2.7 | 2.4 | 2.8 | 3.5 | 4.0 | 4.4 |
| Std. Dev. | K-Cycles | 1.0 | 0.4 | 1.4 | 1.0 | 0.9 | 1.8 | 1.3 | 2.2 |
| Max. | K-Cycles | 3.6 | 3.0 | 4.7 | 4.4 | 4.0 | 6.0 | 5.9 | 7.6 |
| Min. | K-Cycles | 0.9 | 1.6 | 0.4 | 1.0 | 1.1 | 1.0 | 1.9 | 1.6 |

As reflected in Tables 1.7A and 1.7B below, DeMattia Crack Initiation tests and DeMattia Crack growth tests were conducted. The legend for the DeMattia Crack Initiation is N.C.=no crack and L.S.=layer separation.

As the data indicates, experimental formulation 5 appears to provide better crack initiation resistance and crack growth resistance in comparison to experimental formulation 2 (control) even though it has shown higher modulus.

TABLE 1.7A

DeMania Crack Initiation and Crack Growth Properties

Formulation Numbers

| Parameter | Units | 1 Target | 2 Control | 3 | 4 | 5 | 6 | 7 |
|---|---|---|---|---|---|---|---|---|
| DeMania Crack Initiation (23° C.) | | | | | | | | |
| KC-1(avg) | mm | N.C. | N.C. | N.C. | N.C. | N.C. | N.C. | N.C. |
| KC-3(avg) | mm | N.C. | N.C. | N.C. | N.C. | N.C. | N.C. | N.C. |
| KC-5(avg) | mm | 1.6 | N.C. | N.C. | 1.9 | N.C. | N.C. | N.C. |
| KC-10(avg) | mm | 5.6 | N.C. | 1.8 | 5.0 | N.C. | 1.2 | 4.2 |
| KC-20(avg) | mm | 8.3 | N.C. | 6.5 | 13.1 | N.C. | 19.3 | 22.4 |
| KC-40(avg) | mm | 14.6 | 7 | 21.2 | 25.0 | N.C. | 25.0 | 25.0 |
| KC-60(avg) | mm | 16.7 | 8.3 | 25.0 | — | N.C. | — | — |
| KC-80(avg) | mm | 16.7 | 13.1 | — | — | N.C. | — | — |
| KC-100(avg) | mm | 16.7 | 16.7 | — | — | N.C. | — | — |
| KC120(avg) | mm | 16.7 | 23.8 | — | — | N.C. | — | — |
| KC140(avg) | mm | 16.7 | 25.0 | — | — | L.S. | — | — |
| KC160(avg) | mm | 16.7 | — | — | — | L.S. | — | — |
| KC180(avg) | mm | 16.7 | — | — | — | L.S. | — | — |
| KC200(avg) | mm | 16.7 | — | — | — | L.S. | — | — |
| DeMattia Crack Growth (23° C.) | | | | | | | | |
| KC-1(avg) | mm | 7.0 | 7.0 | 4.9 | 4.3 | 3.1 | 7.6 | 4.5 |
| KC-3(avg) | mm | 12.7 | 13.5 | 7.9 | 7.2 | 4.3 | 11.9 | 6.7 |
| KC-5(avg) | mm | 17.2 | 18.8 | 9.7 | 10.8 | 6.2 | 15.3 | 8.2 |
| KC-10(avg) | mm | 25.0 | 25.0 | 15.0 | 15.9 | 7.8 | 21.0 | 11.9 |
| KC-20(avg) | mm | — | — | 19.1 | 23.1 | 8.8 | 25.0 | 18.4 |
| KC-40(avg) | mm | — | — | 25.0 | 25.0 | 9.4 | — | 23.1 |
| KC-60(avg) | mm | — | — | — | — | 11.3 | — | 25.0 |
| KC-80(avg) | mm | — | — | — | — | 13.1 | — | — |
| KC100(avg) | mm | — | — | — | — | 14.9 | — | — |
| KC120(avg) | mm | — | — | — | — | 15.4 | — | — |
| KC140(avg) | mm | — | — | — | — | 15.6 | — | — |
| KC160(avg) | mm | — | — | — | — | 16.6 | — | — |
| KC180(avg) | mm | — | — | — | — | 16.8 | — | — |
| KC200(avg) | mm | — | — | — | — | 17.3 | — | — |

TABLE 1.7B

DeMattia Crack Initiation and Crack Growth Properties
Formulation Numbers

| Parameter | Units | 8 | 9 | 10 | 11 | 12 | 13 | 14 | 15 |
|---|---|---|---|---|---|---|---|---|---|
| DeMania Crack Initiation (23° C.) | | | | | | | | | |
| KC-1(avg) | mm | N.C. | N.C. | N.C. | N.C. | N.C. | N.C. | N.C. | N.C. |
| KC-3(avg) | mm | N.C. | N.C. | N.C. | N.C. | N.C. | N.C. | N.C. | N.C. |
| KC-5(avg) | mm | N.C. | N.C. | N.C. | N.C. | N.C. | N.C. | N.C. | N.C. |
| KC-10(avg) | mm | N.C. | N.C. | N.C. | N.C. | 4.5 | N.C. | N.C. | N.C. |

TABLE 1.7B-continued

DeMattia Crack Initiation and Crack Growth Properties
Formulation Numbers

| Parameter | Units | 8 | 9 | 10 | 11 | 12 | 13 | 14 | 15 |
|---|---|---|---|---|---|---|---|---|---|
| KC-20(avg) | mm | 8.3 | L.S | L.S | N.C. | 20.2 | 7.3 | 1.2 | N.C. |
| KC-40(avg) | mm | 25.0 | 4.6 | L.S | L.S | 25.0 | 10.7 | 1.8 | 6.3 |
| KC-60(avg) | mm | — | 14.0 | 18.4 | 18.8 | — | 21.7 | 7.0 | 16.5 |
| KC-80(avg) | mm | — | 23.5 | 25.0 | 25.0 | — | 25.0 | 18.6 | 25.0 |
| KC100(avg) | mm | — | 25.0 | — | — | — | — | 25.0 | — |
| KC120(avg) | mm | — | — | — | — | — | — | — | — |
| KC140(avg) | mm | — | — | — | — | — | — | — | — |
| KC160(avg) | mm | — | — | — | — | — | — | — | — |
| KC180(avg) | mm | — | — | — | — | — | — | — | — |
| KC200(avg) | mm | — | — | — | — | — | — | — | — |
| DeMattia Crack Growth (23° C.) | | | | | | | | | |
| KC-1(avg) | mm | 6.7 | 5.5 | 7.4 | 5.5 | 7.1 | 9.3 | 12.8 | 12.1 |
| KC-3(avg) | mm | 10.3 | 8.3 | 9.7 | 8.3 | 11.0 | 13.3 | 17.3 | 17.4 |
| KC-5(avg) | mm | 13.0 | 9.8 | 11.8 | 10.9 | 13.1 | 16.7 | 20.0 | 19.4 |
| KC-10(avg) | mm | 15.3 | 16.7 | 14.0 | 15.5 | 18.4 | 20.0 | 24.3 | 23.2 |
| KC-20(avg) | mm | 19.8 | 22.0 | 16.7 | 20.5 | 22.4 | 22.7 | 25.0 | 23.5 |
| KC-40(avg) | mm | 23.2 | 25.0 | 18.2 | 23.2 | 23.7 | 25.0 | — | 23.9 |
| KC-60(avg) | mm | 25.0 | — | 23.5 | 25.0 | 24.1 | — | — | 24.4 |
| KC-80(avg) | mm | — | — | 25.0 | — | 25.0 | — | — | 25.0 |
| KC100(avg) | mm | — | — | — | — | — | — | — | — |
| KC120(avg) | mm | — | — | — | — | — | — | — | — |
| KC140(avg) | mm | — | — | — | — | — | — | — | — |
| KC160(avg) | mm | — | — | — | — | — | — | — | — |
| KC180(avg) | mm | — | — | — | — | — | — | — | — |
| KC200(avg) | mm | — | — | — | — | — | — | — | — |

To conduct further testing on the experimental formulations, abrasion, peel adhesion, and ozone resistance properties were tested. The data is reflected in Tables 1.8A and 1.8B below. The failure mode legend is as follows: P=Plucking and I=Interfacial.

The ozone resistance tests were carried out on the experimental formulations. The samples were either in the form of a dumbbell or rectangle shape. The samples were exposed to ozone under static conditions at a prescribed ozone concentration (50 pphm) and temperature (40° C.) in a chamber. The specimens are periodically examined with unaided eye or by magnification for signs of cracking. For the ozone resistance tests in Tables 1.8A and 1.8B, the legend for the Number of Cracks Rating is according to the following: N.C.=No crack; A=Small number of cracks; B=Large number of cracks; and C=Too many cracks to count. The Size and Depth of Cracks Rating is according to the following: 1=Cracks which cannot be seen with the naked eyes, but can be confirmed with 07 times magnifying glass; 2=Cracks which can be confirmed by the naked eyes; 3=Cracks which are deep and comparatively large (under 1 mm); 4=Cracks which are deep and large (1 mm to 3 mm); 5=Cracks which are 3 mm or larger to severe; *=out of 2 samples, 1 sample broken; BK=broken, N.C.=no crack.

As to the Abrasion Loss, ARI, and Peel Adhesion, lower abrasion resistance and peel adhesion for all of the PE(D) M-based experimental formulations were observed in comparison to experimental formulation 1 (target) and experimental formulation 2 (control). As to the ozone resistance, the number of cracks appear lower for the PE(D)M-based experimental formulation 5 in comparison to experimental formulation 2 (control) after 48 hours of ozone exposure.

TABLE 1.8A

Abrasion, Peel Adhesion, and Ozone Resistance Properties

Formulation Numbers
Ozone Cracking (50 pphm, 40° C. and 20% extension)

| Parameter | Units | 1 Target | 2 Control | 3 | 4 | 5 | 6 | 7 |
|---|---|---|---|---|---|---|---|---|
| Peel Strength | kgf/cm | 32.9 | 30.0 | 9.5 | 6.8 | 9.0 | 6.8 | 8.3 |
| Failure mode | — | P | P | I | I | I | I | I |
| Abrasion Loss | mm$^3$ | 93 | 89 | 169 | 170 | 139 | 156 | 175 |
| ARI | % | 161 | 168 | 89 | 88 | 108 | 97 | 86 |
| Ozone Cracking (50 pphm, 40° C. and 20% extension) | | | | | | | | |
| After 2 hrs | rating | N.C. | N.C. | C2 | C2 | N.C. | N.C. | N.C. |
| After 4 hrs | rating | N.C. | N.C. | C2 | C2 | N.C. | N.C. | A1 |
| After 24 hrs | rating | N.C. | N.C. | C3 | C3 | NC | B3 | B3 |
| After 48 hrs | rating | N.C. | C1 | C4 | BK | A2 | B5 | BK |

TABLE 1.8A-continued

Abrasion, Peel Adhesion, and Ozone Resistance Properties

Formulation Numbers
Ozone Cracking (50 pphm, 40° C. and 20% extension)

| Parameter | Units | 1 Target | 2 Control | 3 | 4 | 5 | 6 | 7 |
|---|---|---|---|---|---|---|---|---|
| After 72 hrs | rating | N.C. | C2 | BK | — | A2 | BK | — |
| After 96 hrs | rating | N.C. | C2 | — | — | A4* | — | — |
| After 120 hrs | rating | N.C. | C3 | — | — | A5* | — | — |
| After 150 hrs | rating | N.C. | C4 | — | — | BK | — | — |

Data TABLE 1.8B

Abrasion, Peel Adhesion, and Ozone Resistance Properties
Formulation Numbers

| Parameter | Units | 8 | 9 | 10 | 11 | 12 | 13 | 14 | 15 |
|---|---|---|---|---|---|---|---|---|---|
| Peel Strength | kgf/cm | 9.7 | 8.2 | 8.9 | 10.9 | 9.3 | 9.7 | 14.7 | 16.8 |
| Failure mode | — | I | I | I | I | I | I | P | P |
| Abrasion Loss | mm$^3$ | 164 | 153 | 158 | 149 | 164 | 157 | 136 | 145 |
| ARI | % | 92 | 98 | 95 | 101 | 92 | 96 | 110 | 103 |
| Ozone Cracking (50 pphm, 40° C. and 20% extension) | | | | | | | | | |
| After 2 hrs | rating | N.C. | N.C. | N.C. | N.C. | N.C. | N.C. | N.C. | N.C. |
| After 4 hrs | rating | A1 | N.C. | N.C. | N.C. | A1 | A1 | A1 | A1 |
| After 24 hrs | rating | B2 | N.C. | A1 | A3 | B3 | A3 | A3 | A3 |
| After 48 hrs | rating | BK | A3 | A4 | BK | BK | A5 | A5 | A5 |
| After 72 hrs | rating | — | A4 | A5 | — | — | BK | BK | BK |
| After 96 hrs | rating | — | A5* | BK | — | — | — | — | — |
| After 120 hrs | rating | — | BK | — | — | — | — | — | — |
| After 150 hrs | rating | — | — | — | — | — | — | — | — |

Example Set 2—In Example Set 2, PE(D)M (5 to 20 phr) was compounded with butyl rubber to approximate tire inner tube formulations. These experimental formulations were then tested similar to the formulations of Example Set 1. The same experimental methods and procedures were used in the same types of tests for Example Set 2 as used in Example Set 1 and described above.

Formulation Table 2.1 below lists the PE(D)M polymers used and some of their properties for the experimental formulations for Example Set 2.

TABLE 2.1

PE(D)M Polymer Properties

| Sample | C2 % | ENB % | ML (1 + 4) @ 125° C. | MFR (2.16 kg at 230° C.) | Mn (LS) (g/mol) | Mw (LS) (g/mol) | Tg (° C.); DSC |
|---|---|---|---|---|---|---|---|
| PE(D)M-2.1 | 5.5 | 2.7 | 16 | 5.9 | 78,000 | 184,000 | −8.6 |
| PE(D)M-2.2 | 14.7 | 2.9 | 15 | 5.4 | 68,000 | 165,000 | −18.4 |
| PE(D)M-2.3 | 5.3 | 3.0 | 54 | 0.61 | 146,000 | 313,000 | −6.5 |

For compounding, the formulations in Table 2.2 were mixed on 1.57 liter capacity lab scale mixer as per the mixing sequence in Table 2.3. For physical testing, samples were cured at 180° C. for a cure time of MDR tc90+2 minutes.

In Table 2.2, note that the C-1 Control sample does not contain EP(D)M or PE(D)M. Control samples C-2 and C-3 contain EP(D)M, but no PE(D)M. Experimental formulations E-1, E-2, E-3, and E-4 contain some of the PE(D)M formulations as described in Table 2.1 in the amounts noted in Table 2.2 below.

The testing results for the experiments run on the above experimental formulations are in the data tables for Example Set 2 below. The testing included PICMA tack, ozone resistance, air permeability, rheological testing, and physical properties.

TABLE 2.2

Experimental Formulations

| | | Formulations | | | | | | |
|---|---|---|---|---|---|---|---|---|
| Ingredients | Units | C-1 | C-2 | E-1 | E-2 | E-3 | C-3 | E-4 |
| Butyl 268S | phr | 100.0 | 90.0 | 90.0 | 90.0 | 90.0 | 85.0 | 85.0 |
| EP(D)M | phr | — | 10.0 | — | — | — | 15.0 | — |
| PE(D)M 2.1 | phr | — | — | 10.0 | — | — | — | 15.0 |
| PE(D)M 2.2 | phr | — | — | — | 10.0 | — | — | — |
| PE(D)M 2.3 | phr | — | — | — | — | 10.0 | — | — |
| Paraffinic Oil HV | phr | 25.0 | 25.0 | 25.0 | 25.0 | 25.0 | 25.0 | 25.0 |
| Carbon N650 | phr | 70.0 | 70.0 | 70.0 | 70.0 | 70.0 | 70.0 | 70.0 |
| Zinc Oxide | phr | 5.0 | 5.0 | 5.0 | 5.0 | 5.0 | 5.0 | 5.0 |
| Stearic Acid | phr | 1.5 | 1.5 | 1.5 | 1.5 | 1.5 | 1.5 | 1.5 |
| ESCOREZ ™ E1102 | phr | — | 3.0 | — | — | — | 3.0 | — |
| Final Batch | | | | | | | | |
| Final Master | phr | 201.5 | 204.5 | 201.5 | 201.5 | 201.5 | 204.5 | 201.5 |
| TMTD | phr | 1.5 | 1.5 | 1.5 | 1.5 | 1.5 | 1.5 | 1.5 |
| MBTS | phr | 0.5 | 0.5 | 0.5 | 0.5 | 0.5 | 0.5 | 0.5 |
| SULFUR | phr | 1.5 | 1.5 | 1.5 | 1.5 | 1.5 | 1.5 | 1.5 |
| Total | phr | 205.0 | 208.0 | 205.0 | 205.0 | 205.0 | 208.0 | 205.0 |

TABLE 2.3

Compounding Sequence

| Sequence of Master Batch Mixing | | Sequence Final Batch Mixing | |
|---|---|---|---|
| Time in Minutes | Addition Sequence | Time in Minutes | Addition Sequence |
| 0' | B268S + EP(D)M + PE(D)M | 0' | ½ MB + curative + ½ MB |
| 1' | ⅔ carbon | 1' | Sweep |
| 2' | ⅓ carbon + oil + other | 2' | Dumped at 95-105° C. |
| 3' | Sweep | | |
| 5' | Dumped at ~160° C. | | |

The PICMA tack test results are reported in Table 2.4 below. The results appear to indicate that the addition of PE(D)M to the formulations increases PICMA tack (e.g., C-1 Control versus E-1 and E-2). The butyl/PE(D)M formulations also show improved tack properties as compared to C-2 Control that has butyl/EP(D)M included. This could indicate that the use of butyl/PE(D)M compound in manufacturing thinner butyl tubes may be advantageous.

TABLE 2.4

PICMA Tack

| | | Experimental Formulations | | | | | | |
|---|---|---|---|---|---|---|---|---|
| Property | Units | C-1 | C-2 | E-1 | E-2 | E-3 | C-3 | E-4 |
| PICMA tack | kgf | 1.05 | 1.11 | 1.25 | 1.24 | 1.17 | 1.03 | 1.15 |

The ozone resistance data is reported in Table 2.5 below. The ozone resistance testing was performed at 50 pphm, 40° C., and 20% stretching using the procedures described with respect to Example Set 1 above. As shown in Table 2.5 below, the PE(D)M formulations show superior ozone resistance when compared to C-1 and the C-2 Control.

TABLE 2.5

Ozone Resistance Results

| Ozone Resistance Test | Units | Experimental Formulations | | | | | | |
|---|---|---|---|---|---|---|---|---|
| | | C-1 | C-2 | E-1 | E-2 | E-3 | C-3 | E-4 |
| After 24 Hrs | rating | N.C. | N.C. | N.C. | N.C. | N.C. | N.C. | N.C. |
| After 48 Hrs | rating | N.C. | N.C. | N.C. | N.C. | N.C. | N.C. | N.C. |
| After 96 Hrs | rating | A-1 | A-2 | A-1 | N.C. | A-1 | A-2 | N.C. |
| After 144 Hrs | rating | B-2 | B-2 | A-2 | A-2 | A-1 | A-2 | A-1 |
| After 168 Hrs | rating | C-2 | C-2 | A-2 | A-2 | A-1 | A-2 | A-1 |

The air permeability test data is reported in Table 2.6 below. The MOCON air permeability testing parameters evaluates the air retention property of the experimental formulations in Example Set 2.

According to the MOCON Air permeability test data, the Butyl/PE(D)M experimental formulations appear to have better air retention characteristics as measured by MOCON air permeability testing than Butyl/EP(D)M blends.

TABLE 2.6

Air Permeability Results

| Mocon | | Experimental Formulations | | | | | | |
|---|---|---|---|---|---|---|---|---|
| Permeability @ 60° C. | Units | C-1 | C-2 | E-1 | E-2 | E-3 | C-3 Control | E-4 |
| Permeance Coefficient | cc/ (m²*day · mm · Hg) | 2.214 | 2.972 | 2.690 | 2.565 | 2.372 | 2.954 | 2.750 |

Rheological test data for the experimental formulations of Example Set 2 are reported below in Table 2.7.

As evident from Table 2.7, the Mooney Viscosity measurements indicate the EP(D)M and PE(D)M experimental formulations appear to be comparable. The Mooney Scorch values indicate the EP(D)M and PE(D)M experimental formulations appear to be comparable. The moving die rheometer (MDR) at 180° C. data shows that cure time and cross link density of the EP(D)M and PE(D)M experimental formulations appear to be comparable.

TABLE 2.7

Rheological Properties

| | | Experimental Formulations | | | | | | |
|---|---|---|---|---|---|---|---|---|
| Property | Units | C-1 | C-2 | E-1 | E-2 | E-3 | C-3 | E-4 |
| Mooney Viscosity | | | | | | | | |
| L(1 + 4) @ 100° C. | MU | 58 | 57 | 57 | 57 | 61 | 57 | 56 |
| Mooney Scorch @ 125° C. | | | | | | | | |
| t2 | min | 21.7 | 24.3 | 21.0 | 20.1 | 18.9 | 23.4 | 20.1 |
| t3 | min | 24.1 | 26.6 | 23.1 | 22.2 | 20.9 | 26.0 | 22.2 |
| t5 | min | 28.3 | 30.5 | 27.5 | 26.3 | 24.4 | 30.1 | 26.0 |
| t35 | min | 47.7 | 49.0 | 48.6 | 47.5 | 44.2 | 49.2 | 45.6 |
| MDR at 180° C. | | | | | | | | |
| ML | dNm | 1.4 | 1.4 | 1.3 | 1.3 | 1.4 | 1.4 | 1.3 |
| MH | dNm | 12.0 | 11.6 | 12.4 | 12.5 | 12.7 | 11.9 | 12.9 |
| MH-ML | dNm | 10.6 | 10.2 | 11.1 | 11.2 | 11.3 | 10.5 | 11.6 |
| ts2 | min | 1.5 | 1.6 | 1.5 | 1.5 | 1.5 | 1.6 | 1.5 |
| ts5 | min | 2.0 | 2.1 | 2.0 | 2.0 | 1.9 | 2.1 | 1.9 |
| tc90 | min | 5.1 | 5.1 | 5.0 | 4.9 | 4.9 | 5.2 | 4.9 |

Extrusion output testing (based on ASTM D2230-17) was also conducted on the experimental formulations and the data is shown in Table 2.8 below.

From this testing, we observed that the Butyl/PE(D)M (E-1 to E-4) experimental formulations appear to be comparable to the control butyl compound C-1 in terms of extrusion output.

TABLE 2.8

Extrusion Output Results

| Properties | units | C-1 | C-2 | E-1 | E-2 | E-3 | C-3 | E-4 |
|---|---|---|---|---|---|---|---|---|
| Garvey Die Extrusion - Barbender | | | | | | | | |
| Rating Method B | | | | | | | | |
| O/P gm/min | gm/min | 103 | 132 | 125 | 125 | 141 | 146 | 143 |
| O/P cm/min | cm/min | 149 | 168 | 164 | 168 | 175 | 181 | 178 |
| Shrinkage % | % | 2.4 | 2.2 | 1.7 | 1.9 | 1.8 | 2.3 | 1.8 |
| Appearance | Rating | A10 | A10 | A10 | A10 | A10 | A10 | A10 |

The physical properties of the experimental formulations for Example Set 2 are reported in Table 2.9 below.

TABLE 2.9

Physical Property Data

| Property | Units | C-1 | C-2 | E-1 | E-2 | E-3 | C-3 | E-4 |
|---|---|---|---|---|---|---|---|---|
| Physical properties - Original | | | | | | | | |
| Hardness | Shore A | 57 | 57 | 59 | 58 | 58 | 58 | 59 |
| 100% mod | MPa | 2.1 | 2.2 | 2.3 | 2.2 | 2.3 | 2.3 | 2.4 |
| 300% mod | MPa | 5.6 | 6.4 | 5.8 | 5.8 | 5.9 | 6.6 | 6.1 |
| Tensile strength | MPa | 10.2 | 11.2 | 9.9 | 10.0 | 9.4 | 11.3 | 9.9 |
| Elongation to break | % | 580 | 570 | 570 | 580 | 520 | 560 | 540 |
| Die C tear test | N/mm | 28.9 | 31.5 | 29.9 | 29.8 | 29.8 | 32.2 | 29.9 |
| After Hot Air Ageing - 125° C. for 3 days | | | | | | | | |
| Hardness | N/mm | 57 | 59 | 59 | 58 | 58 | 61 | 59 |
| 100% mod | MPa | 2.2 | 2.6 | 2.6 | 2.6 | 2.6 | 2.9 | 2.8 |
| 300% mod | MPa | 6.1 | 7.6 | 6.9 | 7.0 | 6.9 | 8.3 | 7.1 |
| Tensile at break | MPa | 8.1 | 8.8 | 8.2 | 8.3 | 8.4 | 9.1 | 8.1 |
| Elongation to break | % | 450 | 370 | 390 | 390 | 410 | 340 | 380 |
| Die C Tear test | N/mm | 25.7 | 25.4 | 26.0 | 26.7 | 26.0 | 25.3 | 25.7 |

Tension set testing (based on ASTM D412-16) was performed on the experimental formulations to correlate the probable tube growth when a tube made from the formulation is in actual use. The tension testing was performed at room temperature and at 105° C. The results are set forth below in Table 2.10. For tension set A, the initial benchmark was 20 mm and the extension was 300%. For tension set B, the initial benchmark was 20 mm and the extension was 50%.

From the data at 105° C., we observe that the butyl/PE(D)M compounds appear to show better retention when compared to the control formulations.

TABLE 2.10

Tension Data

| Property | Units | C-1 Control | C-2 Control | E-1 | E-2 | E-3 | C-3 Contol | E-4 |
|---|---|---|---|---|---|---|---|---|
| Tension Set A | | | | | | | | |
| Initial Bench Mark: 20 mm, Extension 300% | | | | | | | | |
| Temperature | ° C. | RT | RT | RT | RT | RT | RT | RT |
| Time | mins | 10 | 10 | 10 | 10 | 10 | 10 | 10 |
| Relaxation time | mins | 10 | 10 | 10 | 10 | 10 | 10 | 10 |
| Tension set Avg. | % | 13.8 | 12.8 | 15.5 | 14.3 | 14.2 | 12.0 | 13.6 |
| Tension Set B | | | | | | | | |
| Initial Bench Mark: 20 mm, Extension 50% | | | | | | | | |
| Temperature | ° C. | 105 | 105 | 105 | 105 | 105 | 105 | 105 |
| Time | hrs | 5 | 5 | 5 | 5 | 5 | 5 | 5 |
| Relaxation time | hrs | 16 | 16 | 16 | 16 | 16 | 16 | 16 |
| Tension set Avg. | % | 17.3 | 17.2 | 14.6 | 15.5 | 15.8 | 16.0 | 14.5 |

For Example Set 2, additional experimental formulations were made where PE(D)M was blended as partial replacement of butyl 268S and EP(D)M as shown in Table 2.11 below.

TABLE 2.11

Additional Experimental Formulations

| Ingredients | Units | C-1 | C-2 | E-5 | E-6 | E-7 | C-3 | E-8 | E-9 | E-10 |
|---|---|---|---|---|---|---|---|---|---|---|
| Master Batch | | | | | | | | | | |
| Butyl 268S | phr | 100 | 90 | 90 | 90 | 90 | 85 | 85 | 85 | 85 |
| EP(D)M | phr | — | 10 | 5 | 5 | 5 | 15 | 7.5 | 7.5 | 7.5 |
| PE(D)M-1 | phr | — | — | 5 | — | — | — | 7.5 | — | — |

TABLE 2.11-continued

| Ingredients | Units | C-1 | C-2 | E-5 | E-6 | E-7 | C-3 | E-8 | E-9 | E-10 |
|---|---|---|---|---|---|---|---|---|---|---|
| PE(D)M-2 | phr | — | — | — | 5 | — | — | — | 7.5 | — |
| PE(D)M-3 | phr | — | — | — | — | 5 | — | — | — | 7.5 |
| Paraffinic Oil | phr | 25 | 25 | 25 | 25 | 25 | 25 | 25 | 25 | 25 |
| Carbon N650 | phr | 70 | 70 | 70 | 70 | 70 | 70 | 70 | 70 | 70 |
| Zinc Oxide | phr | 5 | 5 | 5 | 5 | 5 | 5 | 5 | 5 | 5 |
| Stearic Acid | phr | 1.5 | 1.5 | 1.5 | 1.5 | 1.5 | 1.5 | 1.5 | 1.5 | 1.5 |
| ESCOREZ E1102 | phr | — | 3 | — | — | — | 3 | — | — | — |
| Final Batch | | | | | | | | | | |
| Multi-pass | phr | 201.5 | 204.5 | 201.5 | 201.5 | 201.5 | 204.5 | 201.5 | 201.5 | 201.5 |
| TMTD | phr | 1.5 | 1.5 | 1.5 | 1.5 | 1.5 | 1.5 | 1.5 | 1.5 | 1.5 |
| MBTS | phr | 0.5 | 0.5 | 0.5 | 0.5 | 0.5 | 0.5 | 0.5 | 0.5 | 0.5 |
| sulfur | phr | 1.5 | 1.5 | 1.5 | 1.5 | 1.5 | 1.5 | 1.5 | 1.5 | 1.5 |
| Total | phr | 205.0 | 208.0 | 205.0 | 205.0 | 205.0 | 208.0 | 205.0 | 205.0 | 205.0 |

Rheological test data for the additional experimental formulations are reported below in Table 2.12.

As seen from Table 2.12, the Mooney Viscosity measurements indicate the PE(D)M experimental formulations appear to be comparable to the controls. The Mooney Scorch values indicate the PE(D)M experimental formulations appear to be comparable to the controls. The moving die rheometer (MDR) at 180° C. data shows that cure time and cross link density of the PE(D)M experimental formulations appear to be comparable to the controls.

TABLE 2.12

Rheological Properties

| Properties | Units | C-1 | C-2 | E-5 | E-6 | E-7 | C-3 | E-8 | E-9 | E-10 |
|---|---|---|---|---|---|---|---|---|---|---|
| Mooney Viscosity @ 100° C. | | | | | | | | | | |
| ML (1 + 4) | MU | 58 | 57 | 59 | 59 | 62 | 57 | 59 | 59 | 63 |
| Mooney Scorch @ 125° C. | | | | | | | | | | |
| T2 | min | 21.7 | 24.3 | 21.2 | 21.6 | 21.2 | 23.4 | 20.8 | 20.7 | 21.3 |
| T3 | min | 24.1 | 26.6 | 24.0 | 24.3 | 23.5 | 26.0 | 23.3 | 23.3 | 23.5 |
| T5 | min | 28.3 | 30.5 | 28.2 | 28.6 | 27.8 | 30.1 | 27.5 | 27.5 | 26.9 |
| T35 | min | 47.7 | 49.0 | 47.6 | 48.2 | 47.5 | 49.2 | 48.0 | 47.7 | 45.8 |
| MDR at 180° C. | | | | | | | | | | |
| ML | dNm | 1.4 | 1.4 | 1.4 | 1.4 | 1.5 | 1.4 | 1.4 | 1.4 | 1.5 |
| MH | dNm | 12.0 | 11.6 | 12.7 | 12.9 | 13.0 | 11.9 | 13.2 | 13.0 | 13.2 |
| MH – ML | dNm | 10.6 | 10.2 | 11.3 | 11.6 | 11.5 | 10.5 | 11.8 | 11.6 | 11.7 |
| ts2 | Min | 1.5 | 1.6 | 1.5 | 1.5 | 1.5 | 1.6 | 1.5 | 1.5 | 1.5 |
| tc50 | Min | 2.1 | 2.1 | 2.1 | 2.1 | 2.1 | 2.1 | 2.1 | 2.1 | 2.1 |
| tc90 | Min | 5.1 | 5.1 | 5.0 | 5.0 | 5.1 | 5.2 | 5.1 | 5.1 | 5.1 |

The PICMA tack test results for the second group of experimental formulations are reported in Table 2.13 below. The PICMA tack tests were conducted on green (uncured) samples.

The results appear to indicate that PE(D)M as a partial replacement for EP(D)M appears to provide acceptable-to-better tackiness.

TABLE 2.13

| | | | | PICMA Tack (Self) | | | | | |
|---|---|---|---|---|---|---|---|---|---|
| Properties | Units | C-1 | C-2 | E-5 | E-6 | E-7 | C-3 | E-8 | E-9 | E-10 |

| | | | | PICMA Tack Test | | | | | |
|---|---|---|---|---|---|---|---|---|---|
| Average Value | kgf | 1.05 | 1.11 | 1.22 | 1.28 | 1.25 | 1.03 | 1.24 | 1.16 | 1.13 |

Ozone Cracking Test (observations)
Ozone Concentration: 50 pphm

| | | | | | | | | | |
|---|---|---|---|---|---|---|---|---|---|
| After 24 hrs | — | N.C. | N.C. | N.C. | N.C. | N.C. | N.C. | N.C. | N.C. | N.C. |
| After 48 hrs | — | N.C. | N.C. | N.C. | N.C. | N.C. | N.C. | N.C. | N.C. | N.C. |
| After 96 hrs | — | A-1 | A-2 | A-1 | A-1 | N.C. | A-2 | N.C. | A-1 | N.C. |
| After 144 hrs | — | B-2 | B-2 | A-2 | A-1 | A-1 | A-2 | N.C. | A-2 | N.C. |
| After 168 hrs | — | C-2 | C-2 | A-2 | A-2 | A-1 | A-2 | A-1 | A-2 | N.C. |

The air permeability test data for the formulations is reported in Table 2.14 below.

According to the MOCON Air permeability test data, PE(D)M appears to be an acceptable replacement for EP(D)M in terms of ozone resistance.

TABLE 2.14

| | | Air Permeability | | | | | | | | |
|---|---|---|---|---|---|---|---|---|---|---|
| Mocon Air Perm. @ 60° C. | units | C-1 | C-2 | E-5 | E-6 | E-7 | C-3 | E-8 | E-9 | E-10 |
| Permeance Coefficient | cc/(m²* day · mm · Hg) | 2.214 | 2.972 | 2.962 | 3.091 | 2.718 | 2.954 | 3.048 | 3.350 | 2.870 |

The physical properties of the experimental formulations are shown in Table 2.15 below.

The results indicate that PE(D)M appears to be an acceptable substitute for EP(D)M in terms of the physical properties of the samples tested.

TABLE 2.15

| | | | | Physical Property Data | | | | | | |
|---|---|---|---|---|---|---|---|---|---|---|
| Properties | Units | C-1 | C-2 | E-5 | E-6 | E-7 | C-3 | E-8 | E-9 | E-10 |

Physical Properties - Original

| | | | | | | | | | | |
|---|---|---|---|---|---|---|---|---|---|---|
| Hardness | Shore A | 57 | 57 | 58 | 59 | 59 | 58 | 59 | 59 | 60 |
| 100% mod | MPa | 2.1 | 2.2 | 2.4 | 2.4 | 2.3 | 2.3 | 2.5 | 2.5 | 2.6 |
| 300% mod | MPa | 5.6 | 6.4 | 6.4 | 6.5 | 6.2 | 6.6 | 6.9 | 6.7 | 7.0 |
| Tensile str. | MPa | 10.2 | 11.2 | 10.5 | 10.4 | 10.3 | 11.3 | 10.7 | 10.3 | 10.8 |
| Elongation to break | % | 580 | 570 | 550 | 540 | 540 | 560 | 520 | 510 | 520 |
| Tear Strength | N/mm | 28.9 | 31.5 | 31.3 | 30.9 | 30.6 | 32.2 | 30.3 | 30.2 | 30.5 |

Physical Properties - Air Aged 125° C. for 3 Days

| | | | | | | | | | | |
|---|---|---|---|---|---|---|---|---|---|---|
| Hardness | Shore A | 57 | 59 | 59 | 59 | 59 | 61 | 61 | 61 | 60 |
| 300% mod | MPa | 6.1 | 7.6 | 7.8 | 8.1 | 8.0 | 8.3 | 8.6 | 8.4 | 8.5 |
| Tensile str. | MPa | 8.1 | 8.8 | 8.9 | 8.6 | 8.8 | 9.1 | 9.2 | 8.9 | 9.0 |
| Elongation to break | % | 450 | 370 | 370 | 340 | 350 | 340 | 330 | 330 | 320 |
| Tear Strength | N/mm | 25.7 | 25.4 | 26.3 | 25.8 | 25.7 | 25.3 | 25.3 | 26.9 | 25.1 |

Example Set 3—Example Set 3 directed to tire innerliner rubber compounds that comprise halobutyl elastomer and PE(D)M blends. These were evaluated for possible use in innerliner applications for tires. The results obtained are reported in the data tables set forth below for Example Set 3.

Table 3.1 below lists properties of the PE(D)M samples used. Tables 3.2A, 3.2B, and 3.2C give the formulations (phr values, unless otherwise specified) for the experimental samples. Some of the samples contain halobutyl rubber but no PE(D)M; these are the control samples 1 through 5. Some contain PE(D)M and halobutyl rubber; these are samples 6 through 18 as set forth in Tables 3.2A, 3.2B, and 3.2C.

TABLE 3.1

PE(D)M Polymer Properties

| Sample | C2 by FTIR (wt %) | ENB by FTIR (wt %) | ML (1 + 4) at 125° C. (MU) | $T_g$ (° C.) | $M_n$ (LS) (g/mol) | $M_w$ (LS) (g/mol) | $M_z$ (LS) (g/mol) |
|---|---|---|---|---|---|---|---|
| PE(D)M 3.1 | 5.5 | 2.7 | 16 | −8.6 | 78,000 | 184,000 | 322,000 |
| PE(D)M 3.2 | 14.7 | 2.9 | 15 | −18.4 | 68,000 | 165,000 | 290,000 |
| PE(D)M 3.3 | 5.3 | 3.0 | 54 | −6.5 | 145809 | 313207 | 510,000 |
| PE(D)M 3.4 | 21.2 | 5.4 | 77 | −22.9 | 149209 | 436793 | 1169160 |
| PE(D)M 3.5 | 23.6 | 2.8 | 13 | −29.6 | 59549 | 138377 | 232987 |

TABLE 3.2A

Experimental Formulations

| Ingredient | 3.1 | 3.2 | 3.3 | 3.4 | 3.5 |
|---|---|---|---|---|---|
| BROMOBUTYL 2222 | 100 | | | | |
| BROMOBUTYL 2255 | | 100 | | | |
| CB 1066 | | | 100 | | |
| NPX 1603 (EXXPRO™ 3563) | | | | 100 | |
| BIIR 6222 | | | | | 100 |
| PE(D)M 3.1 | | | | | |
| PE(D)M 3.2 | | | | | |
| PE(D)M 3.3 | | | | | |
| PE(D)M 3.4 | | | | | |
| PE(D)M 3.5 | | | | | |
| N660 (GPF)-Carbon Black | 60 | 60 | 60 | 60 | 60 |
| Naphthenic Oil | 8 | 8 | 8 | 8 | 8 |
| STRUKTOL 40MS | 7 | 7 | 7 | 7 | 7 |
| Stearic Acid | 1 | 1 | 1 | 1 | 1 |
| Escorez™ 1102 | 4 | 4 | 4 | 4 | 4 |
| MgO | 0.15 | 0.15 | 0.15 | 0.15 | 0.15 |
| Multipass phr level | 180.15 | 180.15 | 180.15 | 180.15 | 180.15 |
| Zinc Oxide | 1 | 1 | 1 | 1 | 1 |
| MBTS | 1.25 | 1.25 | 1.25 | 1.25 | 1.25 |
| Sulfur | 0.5 | 0.5 | 0.5 | 0.5 | 0.5 |
| Total phr | 182.9 | 182.9 | 182.9 | 182.9 | 182.9 |

TABLE 3.2B

Experimental Formulations

| Ingredient | 3.6 | 3.7 | 3.8 | 3.9 | 3.10 | 3.11 |
|---|---|---|---|---|---|---|
| BROMOBUTYL 2222 | 90 | 80 | 90 | 90 | 90 | 90 |
| BROMOBUTYL 2255 | | | | | | |
| CB 1066 | | | | | | |
| NPX 1603 (EXXPRO™ 3563) | | | | | | |
| BIIR 6222 | | | | | | |
| PE(D)M 1 | 10 | 20 | | | | |
| PE(D)M 2 | | | 10 | | | |
| PE(D)M 3 | | | | 10 | | |
| PE(D)M 4 | | | | | 10 | |
| PE(D)M 5 | | | | | | 10 |
| N660 (GPF)-Carbon Black | 60 | 60 | 60 | 60 | 60 | 60 |
| Naphthenic Oil | 8 | 8 | 8 | 8 | 8 | 8 |
| STRUKTOL 40MS | 7 | 7 | 7 | 7 | 7 | 7 |
| Stearic Acid | 1 | 1 | 1 | 1 | 1 | 1 |
| ESCOREZ™ 1102 | 4 | 4 | 4 | 4 | 4 | 4 |
| MgO | 0.15 | 0.15 | 0.15 | 0.15 | 0.15 | 0.15 |
| Multipass phr level | 180.15 | 180.15 | 180.15 | 180.15 | 180.15 | 180.15 |
| Zinc Oxide | 1 | 1 | 1 | 1 | 1 | 1 |
| MBTS | 1.25 | 1.25 | 1.25 | 1.25 | 1.25 | 1.25 |
| Sulfur | 0.5 | 0.5 | 0.5 | 0.5 | 0.5 | 0.5 |
| Total phr | 182.9 | 182.9 | 182.9 | 182.9 | 182.9 | 182.9 |

TABLE 3.2C

Experimental Formulations

| Ingredient | 3.12 | 3.13 | 3.14 | 3.15 | 3.16 | 3.17 | 3.18 |
|---|---|---|---|---|---|---|---|
| BROMOBUTYL 2222 | | | | | 90 | 90 | 90 |
| BROMOBUTYL 2255 | 90 | | | | | | |
| CB 1066 | | 90 | | | | | |
| NPX 1603 (EXXPRO™ 3563) | | | 90 | | | | |
| BIIR 6222 | | | | 90 | | | |
| PE(D)M 1 | 10 | 10 | 10 | 10 | 10 | 10 | 10 |
| PE(D)M 2 | | | | | | | |
| PE(D)M 3 | | | | | | | |
| PE(D)M 4 | | | | | | | |
| PE(D)M 5 | | | | | | | |
| N660 (GPF)-Carbon Black | 60 | 60 | 60 | 60 | 60 | 60 | 60 |
| Naphthenic Oil | 8 | 8 | 8 | 8 | | | |
| STRUKTOL 40MS | 7 | 7 | 7 | 7 | 7 | | |
| Stearic Acid | 1 | 1 | 1 | 1 | 1 | 1 | 1 |

TABLE 3.2C-continued

| | Experimental Formulations | | | | | | |
|---|---|---|---|---|---|---|---|
| Ingredient | 3.12 | 3.13 | 3.14 | 3.15 | 3.16 | 3.17 | 3.18 |
| ESCOREZ™ 1102 | 4 | 4 | 4 | 4 | 4 | 4 | |
| MgO | 0.15 | 0.15 | 0.15 | 0.15 | 0.15 | 0.15 | 0.15 |
| Multipass phr level | 180.15 | 180.15 | 180.15 | 180.15 | 172.15 | 165.15 | 161.15 |
| Zinc Oxide | 1 | 1 | 1 | 1 | 1 | 1 | 1 |
| MBTS | 1.25 | 1.25 | 1.25 | 1.25 | 1.25 | 1.25 | 1.25 |
| Sulfur | 0.5 | 0.5 | 0.5 | 0.5 | 0.5 | 0.5 | 0.5 |
| Total phr | 182.9 | 182.9 | 182.9 | 182.9 | 174.9 | 167.9 | 163.9 |

Table 3.3 identifies each experimental formulation for clarity's sake from Tables 3.2A through 3.2C.

TABLE 3.3

| Experimental Formulation Identification | |
|---|---|
| Formulation No. | Formulation ID |
| 3.1 | Control 2222 |
| 3.2 | Control 2255 |
| 3.3 | Control 1066 |
| 3.4 | Control 1603 |
| 3.5 | Control BIIR 6222 |
| 3.6 | 2222/PE(D)M 1 (90:10) |
| 3.7 | 2222/PE(D)M 1 (80:20) |
| 3.8 | 2222/PE(D)M 2 (90:10) |
| 3.9 | 2222/PE(D)M 3 (90:10) |
| 3.10 | 2222/PE(D)M 4 (90:10) |
| 3.11 | 2222/PE(D)M 5 (90:10) |
| 3.12 | 2255/PE(D)M 1 (90:10) |
| 3.13 | 1066/PE(D)M 1 (90:10) |
| 3.14 | 3563/PE(D)M 1 (90:10) |
| 3.15 | 6222/PE(D)M 1 (90:10) |
| 3.16 | 2222/PE(D)M 1 (90:10)/No Oil |
| 3.17 | 2222/PE(D)M 1 (90:10)/No Oil/No 40 MS |
| 3.18 | 2222/PE(D)M 1(90:10)/No Oil/No 40 MS/No Tackifier |

These experimental formulations were compounded in a 1.57 liter capacity lab scale mixer as per following mixing sequence in Table 3.4. Carbon black, oil, and other compounding ingredients were added and the 1st pass or non-productive compound dropped at ~160° C. The final or productive compound containing the vulcanization system was prepared by a similar process but using a drop or dump temperature of ~100° C. Mixing sequence and discharge/dump temperature conditions kept similar for butyl and EXXPRO™ based tire curing bladder application. All molding was done at 175° C. for 15 minutes.

TABLE 3.4

| Compounding Sequence | | | |
|---|---|---|---|
| Sequence of Master Batch Mixing | | Sequence Final Batch Mixing | |
| Time (min) | Addition Sequence | Time (min) | Addition Sequence |
| 0' | Add Polymer (HIIR/PE(D)M) | 0' | ½ MB + curative + ½ MB |
| 1' | Carbon Black + Oil + Chemicals | 1' | Sweep |
| 2' | Sweep | 2' | Dumped at 95-105° C. |
| 3' | Sweep | | |
| 5' | Dumped at 135° C.-145° C. | | |

Data regarding the rheological properties of the experimental formulations are set forth below in Table 3.5.

TABLE 3.5

| Rheological Properties | | | | | | | |
|---|---|---|---|---|---|---|---|
| Form. No. | Mooney Viscosity ML 1+4 at 100° C. | Mooney Scorch at 125° C. (T5) | Mooney Scorch at 135° C. (T5) | MH – ML (dNm) | TS2 (min) | T10 (min) | T50 (min) | T90 (min) |
| 3.1 | 58 | 60.4 | 28.4 | 4.4 | 3.6 | 1.6 | 3.9 | 6.9 |
| 3.2 | 71 | 26.8 | 13.9 | 4.2 | 2.9 | 1.1 | 3.0 | 5.7 |
| 3.3 | 61 | — | 34.1 | 5.0 | 2.9 | 1.7 | 3.2 | 5.5 |
| 3.4 | 60 | — | 58.0 | 5.4 | 5.1 | 3.2 | 6.1 | 13.5 |
| 3.5 | 55 | — | 29.9 | 3.9 | 3.5 | 1.5 | 3.5 | 5.9 |
| 3.6 | 58 | — | 30.5 | 4.5 | 3.6 | 1.6 | 3.9 | 7.3 |
| 3.7 | 60 | — | 32.6 | 4.4 | 3.8 | 1.6 | 4.2 | 8.5 |
| 3.8 | 58 | — | 31.0 | 4.6 | 3.7 | 1.7 | 4.1 | 7.7 |
| 3.9 | 63 | 57.8 | 27.5 | 4.5 | 3.3 | 1.5 | 3.6 | 6.8 |
| 3.10 | 65 | 58.2 | 27.1 | 5.0 | 3.3 | 1.5 | 3.8 | 7.3 |
| 3.11 | 58 | 60.7 | 29.0 | 4.3 | 3.6 | 1.6 | 3.7 | 6.8 |
| 3.12 | 68 | 35.4 | 16.8 | 4.2 | 3.1 | 1.1 | 3.2 | 6.3 |
| 3.13 | 59 | — | 38.4 | 4.7 | 3.1 | 1.7 | 3.4 | 6.0 |
| 3.14 | 59 | — | | 5.0 | 5.3 | 3.1 | 6.0 | 13.4 |
| 3.15 | 56 | — | 33.8 | 3.9 | 3.7 | 1.6 | 3.7 | 6.4 |
| 3.16 | 77 | 51.3 | 23.8 | 5.5 | 2.8 | 1.3 | 3.5 | 6.8 |
| 3.17 | 81 | 45.5 | 21.4 | 6.3 | 2.3 | 1.2 | 3.1 | 5.8 |
| 3.18 | 91 | 41.3 | 19.4 | 8.0 | 2.1 | 1.1 | 3.2 | 6.2 |

Data regarding the physical properties of the experimental formulations are set forth below in Table 3.6 below. Curing of the samples was performed at 175° C. for 15 minutes each.

TABLE 3.6

Physical Properties

| Form. No. | Modulus at 100% (MPa) | Modulus at 300% (MPa) | Tensile Strength (MPa) | Elong. at Break (%) | Tear Strength (N/mm) | Hardness (Shore A) |
|---|---|---|---|---|---|---|
| 3.1 | 1.1 | 4.4 | 10.3 | 633 | 43.3 | 41 |
| 3.2 | 1.7 | 6.1 | 10.9 | 558 | 48.4 | 42 |
| 3.3 | 1.2 | 4.3 | 9.9 | 677 | 43.1 | 43 |
| 3.4 | 1.9 | 5.9 | 9.4 | 621 | 41.9 | 50 |
| 3.5 | 1.2 | 4.1 | 8.8 | 630 | 38.9 | 43 |
| 3.6 | 1.2 | 4.3 | 9.7 | 692 | 41.4 | 43 |
| 3.7 | 1.3 | 4.3 | 8.5 | 665 | 40.8 | 47 |
| 3.8 | 1.2 | 4.2 | 9.3 | 659 | 43.2 | 43 |
| 3.9 | 1.2 | 4.2 | 9.4 | 681 | 44.8 | 43 |
| 3.10 | 1.3 | 4.4 | 10.1 | 677 | 46.2 | 44 |
| 3.11 | 1.2 | 4.4 | 9.2 | 651 | 42.4 | 43 |
| 3.12 | 1.4 | 5.3 | 10.1 | 612 | 46.2 | 44 |
| 3.13 | 1.3 | 4 | 8.8 | 704 | 39.8 | 43 |
| 3.14 | 1.6 | 4.7 | 8.6 | 717 | 42.2 | 49 |
| 3.15 | 1.3 | 4.1 | 7.8 | 613 | 34.8 | 43 |
| 3.16 | 1.8 | 5.7 | 10.2 | 634 | 47.0 | 49 |
| 3.17 | 2.1 | 9 | 12.3 | 454 | 46.6 | 51 |
| 3.18 | 2.7 | 10.1 | 12.4 | 427 | 42.7 | 56 |

Data regarding the aged physical properties aged with hot air ageing at 125° C. for 3 days are set out in Table 3.7. Curing of the samples was performed at 175° C. for 15 minutes each.

TABLE 3.7

Physical Properties of Aged Samples
(@ Hot Air Aging at 125° C. for 3 days)

| Formulation No. | Modulus at 100% MPa | Modulus at 300% MPa | Tensile Strength MPa | Elongation at Break % | Tear Strength (N/mm) | Hardness (Sh A) |
|---|---|---|---|---|---|---|
| 3.1 | 2.2 | 6.6 | 8.2 | 448 | 38.2 | 54 |
| 3.2 | 2.5 | 7 | 8.3 | 410 | 37.5 | 56 |
| 3.3 | 2.3 | 6.3 | 8 | 437 | 36.4 | 58 |
| 3.4 | 3.6 | 9 | 11.2 | 516 | 49.5 | 60 |
| 3.5 | 2.6 | 6.9 | 7.9 | 375 | 35.5 | 63 |
| 3.6 | 2.1 | 6.1 | 7.8 | 476 | 40.9 | 58 |
| 3.7 | 2.1 | 5.4 | 7.6 | 574 | 42.2 | 58 |
| 3.8 | 2.2 | 6 | 7.8 | 485 | 41.3 | 55 |
| 3.9 | 2.4 | 6.2 | 7.9 | 461 | 39.8 | 58 |
| 3.10 | 2.3 | 6.9 | 8.6 | 462 | 41.1 | 57 |
| 3.11 | 2.2 | 6.2 | 7.8 | 459 | 38.4 | 55 |
| 3.12 | 2.4 | 6.6 | 8.1 | 449 | 39.1 | 57 |
| 3.13 | 2.4 | 6.2 | 7.5 | 438 | 37.5 | 60 |
| 3.14 | 2.9 | 7.5 | 10.6 | 563 | 49.2 | 59 |
| 3.15 | 2.6 | 6.1 | 6.9 | 393 | 36.7 | 60 |
| 3.16 | 2.3 | 6.6 | 8.3 | 469 | 41.3 | 58 |
| 3.17 | 2.8 | 9.1 | 10.7 | 378 | 38.2 | 58 |
| 3.18 | 3.5 | 11.2 | 11.9 | 331 | 37.7 | 64 |

Data regarding the physical properties of the experimental formulations are set forth below in Table 3.8 below. Curing of the samples was performed at 175° C. for 15 minutes each.

TABLE 3.8

Physical Properties

| Form. No. | Tensile Strength Retention (%) | Elongation at Break (%) | Tack to Carcass compound (g) | Green Strength (MPa) | Stress to 75% Relaxation (min) | MOCON Permeability at 40° C. cc*mm/($m^2$*day · mm · Hg) |
|---|---|---|---|---|---|---|
| 3.1 | 80 | 71 | 674 | 0.25 | 1.8 | 0.278 |
| 3.2 | 76 | 73 | 781 | 0.29 | 3.5 | 0.281 |
| 3.3 | 81 | 65 | 809 | 0.23 | 1.4 | 0.288 |
| 3.4 | 120 | 83 | 977 | 0.28 | 1.7 | 0.256 |
| 3.5 | 90 | 60 | 1475 | 0.27 | 1.7 | 0.272 |
| 3.6 | 80 | 69 | 706 | 0.28 | 1.8 | 0.320 |
| 3.7 | 90 | 86 | 593 | 0.30 | 2.0 | 0.398 |
| 3.8 | 84 | 74 | 1845 | 0.27 | 1.8 | 0.358 |
| 3.9 | 84 | 68 | 677 | 0.27 | 1.9 | 0.325 |
| 3.10 | 86 | 68 | 1296 | 0.28 | 2.0 | 0.354 |
| 3.11 | 84 | 70 | 553 | 0.35 | 3.3 | 0.354 |
| 3.12 | 80 | 73 | 989 | 0.39 | 8.3 | 0.340 |
| 3.13 | 85 | 62 | 827 | 0.33 | 2.5 | 0.337 |
| 3.14 | 122 | 78 | 1287 | 0.43 | 2.8 | 0.292 |
| 3.15 | 88 | 64 | 715 | 0.39 | 3.1 | 0.320 |
| 3.16 | 81 | 74 | 799 | 0.47 | 4.2 | 0.232 |
| 3.17 | 87 | 83 | 702 | 0.50 | 4.6 | 0.220 |
| 3.18 | 96 | 78 | 763 | 0.51 | 4.4 | 0.209 |

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:
1. A tire that comprises:
a rubber compound that comprises:
5 phr to 50 phr of a propylene-α-olefin-(optional diene) PE(D)M polymer that comprises about 65 wt % to about 99.5 wt % propylene, about 0.5 wt % to about 35 wt % $C_2$ or $C_4$ to $C_{16}$ α-olefin, and 0 wt % to about 20 wt % diene, said wt % based on the weight of the PE(D)M polymer, wherein the wt % numbers are uncorrected numbers, and wherein wt % propylene plus wt % of $C_2$ or $C_4$ to $C_{16}$ α-olefin equals 100%, and wherein the PE(D)M polymer has a heat of fusion (Hf) of less than 1 J/g, and
50 parts per hundred parts rubber (phr) to 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof; and
wherein the rubber and the PE(D)M polymer cumulatively are 100 phr, and
wherein the rubber compound is included in a sidewall of the tire, an inner tube of the tire, an innerliner of the tire, or any combination thereof.
2. The tire of claim 1, wherein the halogenated isobutylene-based rubber is selected from the group consisting of: bromobutyl rubber, chlorobutyl rubber, brominated polymers derived from a copolymer of isobutylene and p-methylstyrene elastomer, and any combination thereof.
3. The tire of claim 1, wherein the rubber further comprises EP(D)M.
4. The tire of claim 1, wherein the rubber compound is included in a sidewall of the tire, an inner tube of the tire, an innerliner of the tire, or any combination thereof.
5. The tire of claim 1, wherein the rubber compound has a Mooney viscosity (ML, 1+4 @100° C.) of about 30 MU to about 100 MU.
6. The tire of claim 1, wherein the rubber compound has a PICMA tack of about 0.9 kgf or greater.
7. The tire of claim 1, wherein the rubber compound has a 180° peel strength after curing at 160° C. for 8 minutes of about 3 kgf/cm to about 25 kgf/cm.
8. The tire of claim 1, wherein the rubber compound has a Shore A hardness after curing at 160° C. for 8 minutes of about 40 to about 70.
9. The tire of claim 1, wherein the rubber compound has a modulus at 100% elongation after curing at 160° C. for 8 minutes of about 0.7 MPa to about 4 MPa.
10. The tire of claim 1, wherein the rubber compound has a tensile strength after curing at 160° C. for 8 minutes of about 7 MPa to about 20 MPa.
11. The tire of claim 1, wherein the rubber compound has an elongation at break after curing at 160° C. for 8 minutes of about 250% to about 800%.
12. The tire of claim 1, wherein the rubber compound has an energy at break after curing at 160° C. for 8 minutes of about 3 J to about 10 J.
13. The tire of claim 1, wherein the rubber compound has an abrasion loss after curing at 160° C. for 8 minutes of about 100 $mm^3$ to about 200 $mm^3$.
14. The tire of claim 1, wherein the rubber compound has a permeance coefficient after curing at 160° C. for 8 minutes of about 1 cc/($m^2$*day·mm·Hg) to about 4 cc/($m^2$*day·mm·Hg).
15. The tire of claim 1, wherein the rubber compound has a tear resistance after curing at 160° C. for 8 minutes of about 25 N/mm to about 50 N/mm.
16. The tire of claim 1, wherein the rubber compound has an ozone resistance where a sample of the rubber compound exhibits no cracking after exposure to 50 pphm ozone at 40° C. for about 4 hours to about 200 hours.
17. The tire of claim 1, wherein the PE(D)M polymer has (a) Mooney viscosity (ML(1+4) @125° C.) of about 5 MU to about 100 MU, and (b) a melt flow rate of about 0.1 g/min to about 100 g/min.
18. The tire of claim 1, wherein the PE(D)M polymer has a number average molecular weight of 40,000 g/mol to 200,000 g/mol.
19. The tire of claim 1, wherein the PE(D)M polymer has a weight average molecular weight of 100,000 g/mol to 500,000 g/mol.
20. The tire of claim 1, wherein the PE(D)M polymer has a polydispersity index of 2.0 to 3.0.
21. The tire of claim 1, wherein the PE(D)M polymer has a glass transition temperature (° C.) of greater than or equal to −7.386−(87.98*E)+(294*D) and less than or equal to −1.386−(87.98*E)+(294*D) wherein E is a mole fraction of ethylene in the PE(D)M polymer and D is a mole fraction of diene in the PE(D)M polymer.
22. The tire of claim 1, wherein the PE(D)M polymer has a glass transition temperature (° C.) of greater than or equal to −6.886−(87.98*E)+(294*D) and less than or equal to −1.886−(87.98*E)+(294*D) wherein E is the mole fraction of ethylene in the PE(D)M polymer and D is the mole fraction of diene in the PE(D)M polymer.
23. The tire of claim 1, wherein the rubber compound is at least partially crosslinked.
24. A method comprising:
producing a master batch at a first temperature, the master batch comprising:
5 phr to 50 phr of a propylene-α-olefin-(optional diene) PE(D)M polymer that comprises about 65 wt % to about 99.5 wt % propylene, about 0.5 wt % to about 35 wt % $C_2$ or $C_4$ to $C_{16}$ α-olefin, and 0 wt % to about 20 wt % diene, said wt % based on the weight of the PE(D)M polymer, wherein the wt % numbers are uncorrected numbers, and wherein wt % propylene plus wt % of $C_2$ or $C_4$ to $C_{16}$ α-olefin equals 100%, and wherein the PE(D)M polymer has a heat of fusion (Hf) of less than 1 J/g, and
50 parts per hundred parts rubber (phr) to 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof; wherein the rubber and the PE(D)M polymer cumulatively are 100 phr; and mixing a curative and/or a crosslinking agent into the master batch at a second temperature that is lower than the first temperature.

25. A tire that comprises:

a rubber compound that comprises:

5 phr to 50 phr of a propylene-α-olefin-(optional diene) PE(D)M polymer that comprises about 65 wt % to about 99.5 wt % propylene, about 0.5 wt % to about 35 wt % $C_2$ or $C_4$ to $C_{16}$ α-olefin, and 0 wt % to about 20 wt % diene, said wt % based on the weight of the PE(D)M polymer, wherein the wt % numbers are uncorrected numbers, and wherein wt % propylene plus wt % of $C_2$ or $C_4$ to $C_{16}$ α-olefin equals 100%, and wherein the PE(D)M polymer has Mooney viscosity (ML(1+4) @125° C.) of about 5 MU to about 100 MU, and 50 parts per hundred parts rubber (phr) to 95 phr of a rubber that comprises one selected from the group consisting of the halogenated isobutylene-based rubber is selected from the group consisting of: natural rubber, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, isobutylene-isoprene rubber, poly(isobutylene-co-alkylstyrene), a halogenated isobutylene-based rubber, polychloroprene rubber, nitrile rubber, and any combination thereof; and wherein the rubber and the PE(D)M polymer cumulatively are 100 phr, and wherein the rubber compound is included in a sidewall of the tire, an inner tube of the tire, an innerliner of the tire, or any combination thereof.

\* \* \* \* \*